(12) United States Patent
Steinfort et al.

(10) Patent No.: US 7,096,616 B2
(45) Date of Patent: Aug. 29, 2006

(54) ANIMAL TAG

(76) Inventors: John James Steinfort, 790 Mirboo North Road, Mirboo North, Victoria (AU) 3871; Neil Frederick Edney, 28 Giles Street, Mirboo North, Victoria (AU) 3871

( * ) Notice: Subject to any disclaimer, the term of this patent is extended or adjusted under 35 U.S.C. 154(b) by 0 days.

(21) Appl. No.: 10/473,778

(22) PCT Filed: Apr. 24, 2002

(86) PCT No.: PCT/AU02/00508

§ 371 (c)(1),
(2), (4) Date: Oct. 2, 2003

(87) PCT Pub. No.: WO02/085106

PCT Pub. Date: Oct. 31, 2002

(65) Prior Publication Data

US 2004/0103568 A1   Jun. 3, 2004

(30) Foreign Application Priority Data

Apr. 24, 2001  (AU) .................................... PR4583
Nov. 26, 2001  (AU) .................................... PR9055

(51) Int. Cl.
*G09F 3/00* (2006.01)
(52) U.S. Cl. .................................................... 40/301
(58) Field of Classification Search ............. 40/300, 40/301; D30/155
See application file for complete search history.

(56) References Cited

U.S. PATENT DOCUMENTS

| | | | |
|---|---|---|---|
| 1,822,390 A | 9/1931 | Brooks | |
| 2,653,400 A | 9/1953 | Sutherland | |
| 2,653,401 A | 9/1953 | Sutherland | |
| 2,956,361 A * | 10/1960 | Hall | 40/300 |
| 3,144,695 A * | 8/1964 | Budwig | 248/60 |
| 3,512,289 A * | 5/1970 | Hayes | 40/301 |
| 3,916,904 A | 11/1975 | Richey | |
| 3,952,438 A | 4/1976 | Propst et al. | |
| 4,441,233 A * | 4/1984 | Swift | 24/16 PB |
| 4,694,781 A * | 9/1987 | Howe et al. | 119/655 |
| 6,055,752 A | 5/2000 | Ritchey | 40/301 |
| 6,145,225 A * | 11/2000 | Ritchey | 40/301 |
| 6,409,237 B1 * | 6/2002 | Olshausen | 292/307 A |
| 6,546,652 B1 * | 4/2003 | Gardner et al. | 40/302 |

FOREIGN PATENT DOCUMENTS

| | | |
|---|---|---|
| AU | 1546670 | 12/1971 |
| DE | 2610564 | 9/1976 |
| DE | 29706633 | 9/1998 |
| FR | 2 141 806 | 1/1973 |
| FR | 2 368 219 | 5/1978 |
| FR | 2380849 | 9/1978 |
| GB | 1515067 | 6/1978 |
| NL | 9 101 468 | 3/1993 |
| RU | 1821109 | 6/1993 |

* cited by examiner

Primary Examiner—Joanne Silbermann
(74) Attorney, Agent, or Firm—Volpe and Koenig, P.C.

(57) ABSTRACT

A tag (1) for attachment to an animal skin comprising, a body portion (2), a skin penetrating head (4) attached to the body portion, and a locking member (6) attached to the body portion at a different location to the skin penetrating head, the locking member being engageable with the skin penetrating head to secure the two from being pulled apart, wherein the construction is such that the body portion is adapted to be bent and held in a configuration of at least two loops when the skin penetrating head is initially inserted through the skin of an animal and engaged with the locking member.

9 Claims, 22 Drawing Sheets

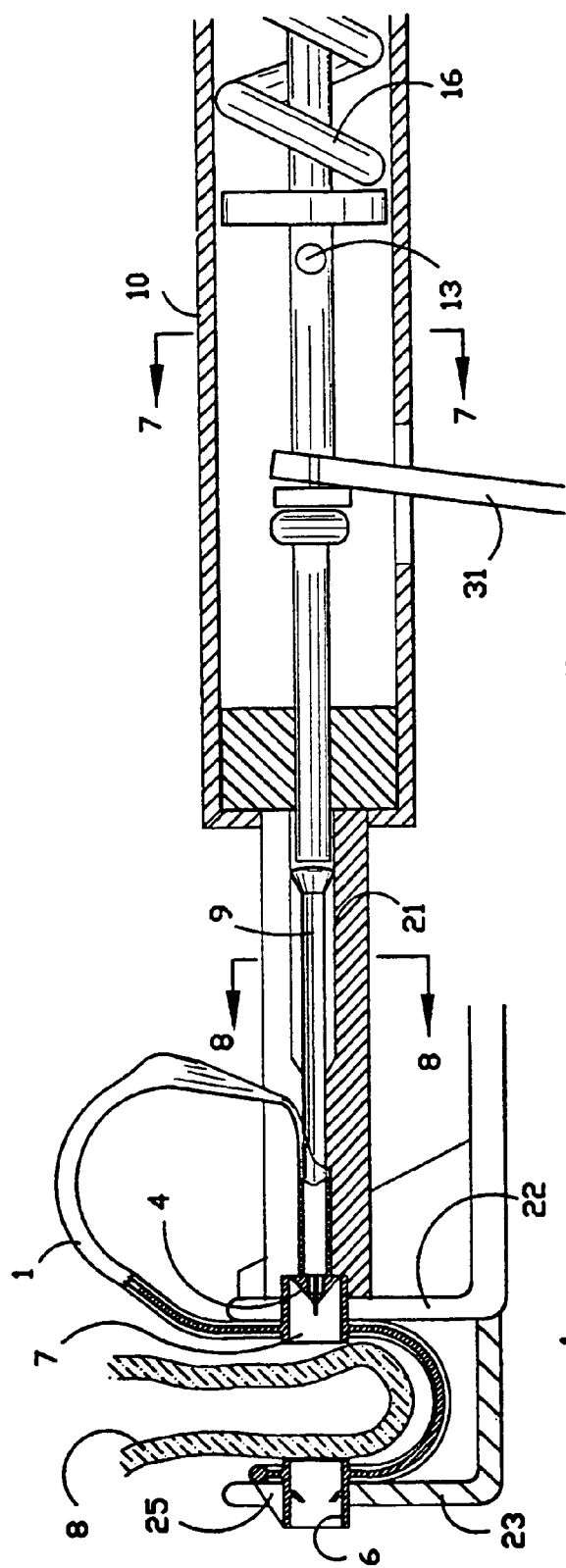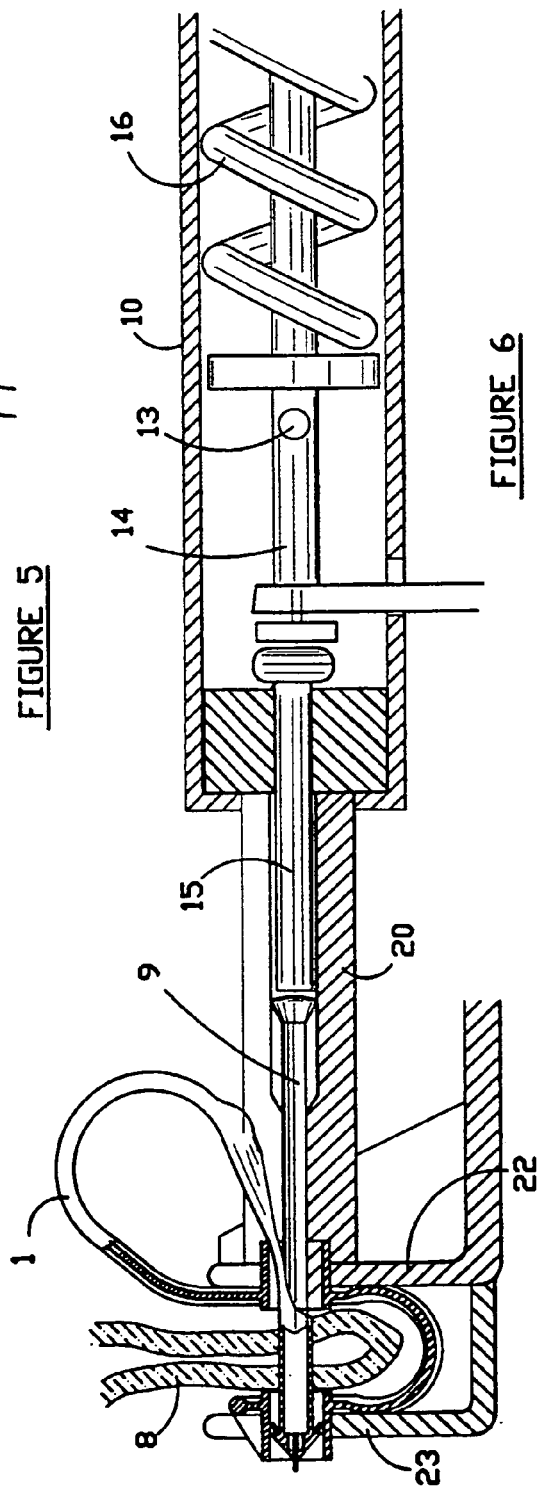
FIGURE 5
FIGURE 6

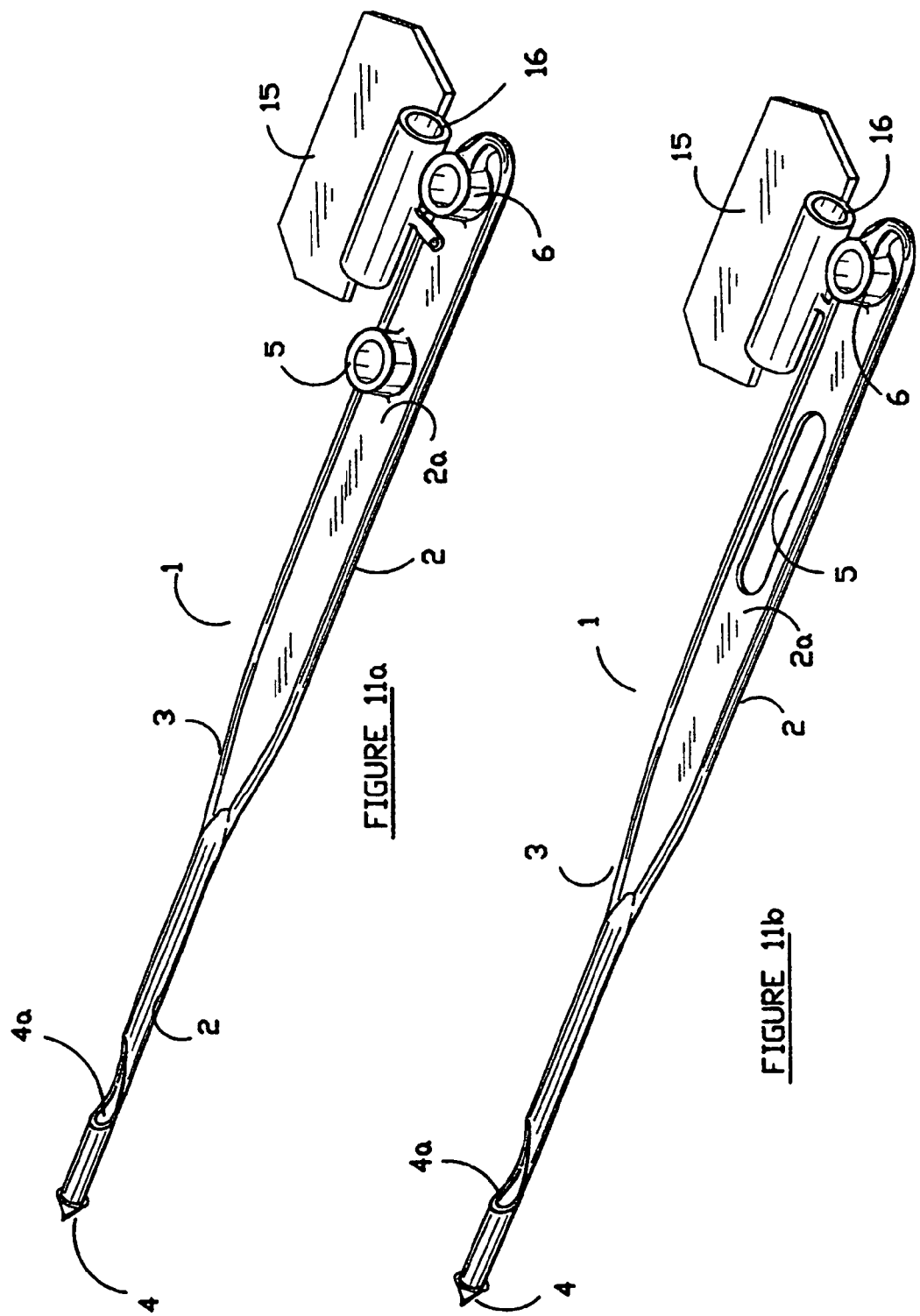

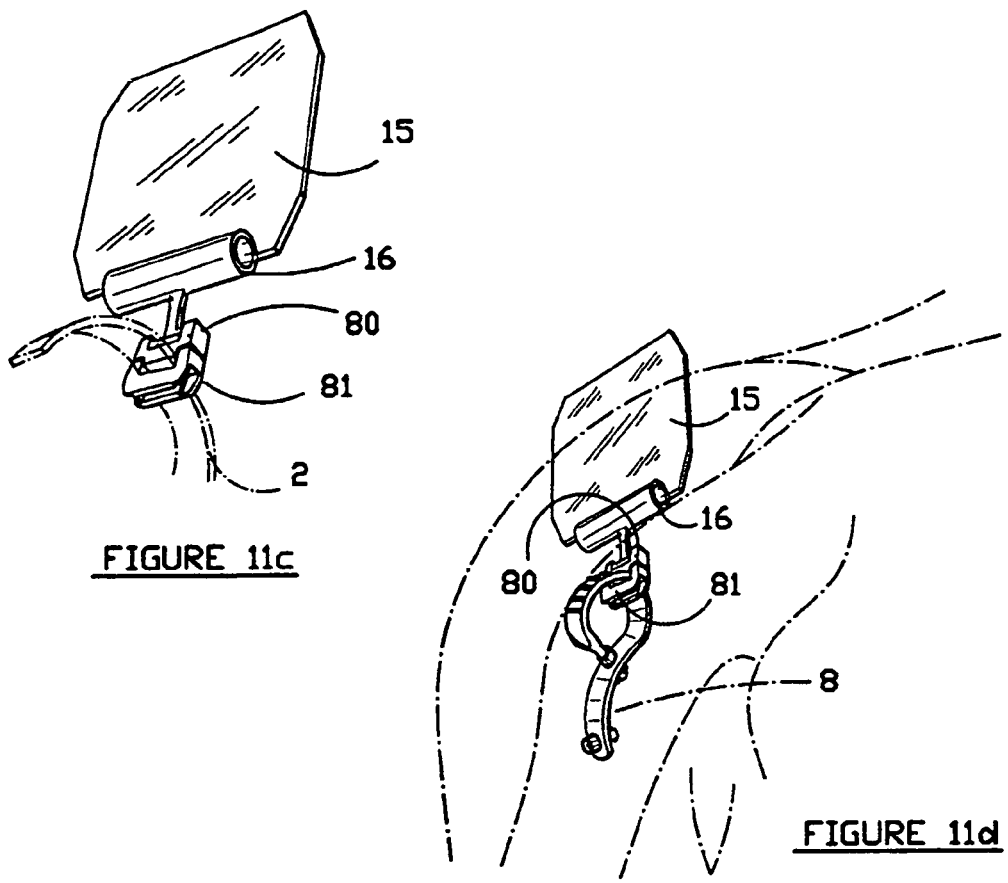
FIGURE 11c
FIGURE 11d
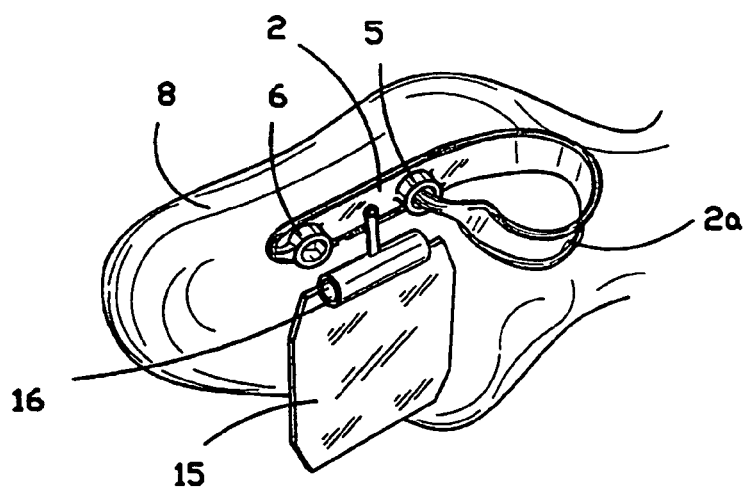
FIGURE 11e

ANIMAL TAG

FIELD OF THE INVENTION

The present invention relates, in general terms, to improvements in or relating to animal tagging, and to methods and apparatus for use therein and therewith. More particularly, but not exclusively, the invention relates to an improved tag, label or the like means (hereinafter referred to as "a tag") for use with animals for a range of purposes which may include allowing for ready identification and/or tracking thereof (for whatever reason).

BACKGROUND OF THE INVENTION

In accordance with the known art, the tagging of animals for purposes of ready identification, tracking or monitoring of movements, etc has involved the use of a tag or the like means of a unitary kind having first and second portions held together, at or adjacent an extremity of each portion, by an expanding region in such a way that a distal extremity of a first portion can be passed through an aperture made in the ear of the animal, for example, with the overall tag then being arranged such that the expanding portion rests positioned through the ear and the respective first and second portions extend, at least to some extent, over the ear of the animal. Such a form of tag has enjoyed universal usage and is applied by taking an appropriate applicator or tool to make a hole in the ear of the animal (be it a sheep, cow, horse or in fact any type of animal, domestic or otherwise) just in from an edge thereof, then prising the respective first and second portions of the aforementioned tag apart so as to enable one of those portions to be inserted through the hole thus created, the two portions then being manipulated into such a condition that the expanding portion rests through the hole formed in the ear of the animal, thereby to allow the respective first and second portions to assume a substantially parallel configuration. It has been found, however, that such tags, despite their long-standing market acceptance, have nonetheless exhibited certain drawbacks or disadvantages. To be more specific, and by way of example only, there exists a significant possibility of such a tag or identification means being deliberately or inadvertently displaced or removed, as for example by the animal rubbing its ear—or for that matter the relevant part of its anatomy where any such tag is located—against any given surface, catching the ear on any form of obstacle, etc. As well, readability of an ear tag can often present difficulties.

It is an object of the invention to provide a tag which obviates or ameliorates one or more of the aforesaid difficulties.

DISCLOSURE OF THE INVENTION

The invention provides a tag for attachment to an animal skin comprising,
a body portion,
a skin penetrating head attached to the body portion, and
a locking member attached to the body portion at a different location to the skin penetrating head, the locking member being engageable with the skin penetrating head to secure the two from being pulled apart,
wherein the construction is such that the body portion is adapted to be bent and held in a configuration of at least two loops when the skin penetrating head is initially inserted through the skin of an animal and engaged with the locking member.

The body portion may include at least one opening through which the skin penetrating head and a section of the body portion may be threaded to bring the penetrating head into engagement with the locking member, the opening serving to hold the tag in the at least two loop configuration.

Suitably, the locking member and body portion are moulded as an integral unit from resilient plastics material. The plastics materials may act to maintain the two loops under tension. Thus, a section of the body portion extending between the opening and penetrating head may expand in the sense that it may pull through the opening to increase in length. By enabling this section of body portion to extend, the tag may be able to accommodate growth of an animal.

In a particular alternative embodiment, the tag may be formable into a configuration of three loops. In such a configuration, the body portion may comprise a receiving member having two locking members spaced apart by an intermediate section,
a flexible strap member having two skin piercing heads spaced apart by a central section of the strap member, and
at least one opening provided in the intermediate section, the at least one opening being constructed so as to allow each skin penetrating head to be threaded through the at least one opening to be engaged by a respective one of the two locking members.

The construction of the three looped tag is preferably one which accommodates growth of an animal in a similar manner to that described with reference to the two loop tag above. In order to achieve this, the at least one opening through which the skin penetrating heads may be threaded should allow for expansion of the two regions of the tag where the penetrating heads are attached to the locking members. Thus, the at least one opening should be in the form of an elongate slot through which both penetrating heads may be threaded. More preferably however, it is preferred that there be two separate openings both in the form of slots.

In another aspect the invention provides a skin penetrating head comprising a central supporting portion of moulded plastics material having at least two thin flanges extending beyond the central supporting portion, the at least two thin flanges having sharp edges and meeting at a sharp point forward of the supporting point, the sharp edges of the at least two flanges each extending for a distance of at least 1 mm and having a width of at least 1 mm and a maximum thickness of 1 mm past the edge of the central supporting portion, the maximum width of the skin penetrating head being no greater than 8 mm.

The flanges may comprise a single piece of metal in the form of an arrowhead extending through and from both sides of the central supporting portion, the central portion of the metal arrowhead extending into an open ended recess formed in the central supporting portion whereby to permit access to the central portion of the metal arrowhead by an implant pin for pushing the penetrating head through animal skin.

In another aspect, the invention provides a method of applying a tag according to the invention to the skin of an animal which comprises,
setting the configuration of the tag so that the skin penetrating head and the locking member are on opposite sides of the skin being tagged which skin is folded to form at least two superimposed layers, pressing the skin penetrating head through the superimposed layers and into engagement with the locking member to form a closed tag in a configuration of at least two loops.

Suitably the skin of the animal is folded to form four superimposed layers. The skin of the ear may be folded in this manner.

One or more flags may be attached to the tag of the invention. It may be attached as an integral part of the tag or by any other suitable means such as by a swivel. Other items may also be attached to the tag. These may include any form of data concerning the animal, a transponder, any form of diagnostic device, any form of treatment device or chemical or electronic device, any form of signalling device and any form of locating device.

In order that the invention may be more clearly understood and put into practical effect reference will now be made to preferred embodiments of a tag in accordance with the present invention, as well as to methods and apparatus for use in the application thereof. The ensuring description is given by way of non-limitative example only and is with reference to the accompanying drawings:

BRIEF DESCRIPTION OF THE DRAWINGS

FIGS. 5 and 6 are views, similar to FIG. 4, showing succeeding stages in the method of disposition of a tag, in accordance with the present invention, on an animal, with FIG. 5 showing the apparatus as primed for discharge, and FIG. 6 showing that same apparatus after discharge;

FIGS. 11a and 11b are views of alternative embodiments for a tag in accordance with the present invention;

FIGS. 11c shows an alternative method of attaching a flag to the tag of FIGS. 11a and 11b;

FIGS. 11d and 11e illustrate fitted tags;

DETAILED DESCRIPTION OF THE PREFERRED EMBODIMENTS

An improved tag in accordance with the present invention, when applied to an animal such as a cow, is preferably located in ear or in the tail-fold area. In reality, however, such a tag may be located at any position on the animal where the thickness of the skin allows for a fold to be formed or created in the skin, as by pinching, as for example folding the ear, or pinching the skin above an udder or in the lateral tail fold, etc. When attached to the tail fold, for example such a tag is not only readily readable, but also easily cleaned as and when necessary.

Figure 1:
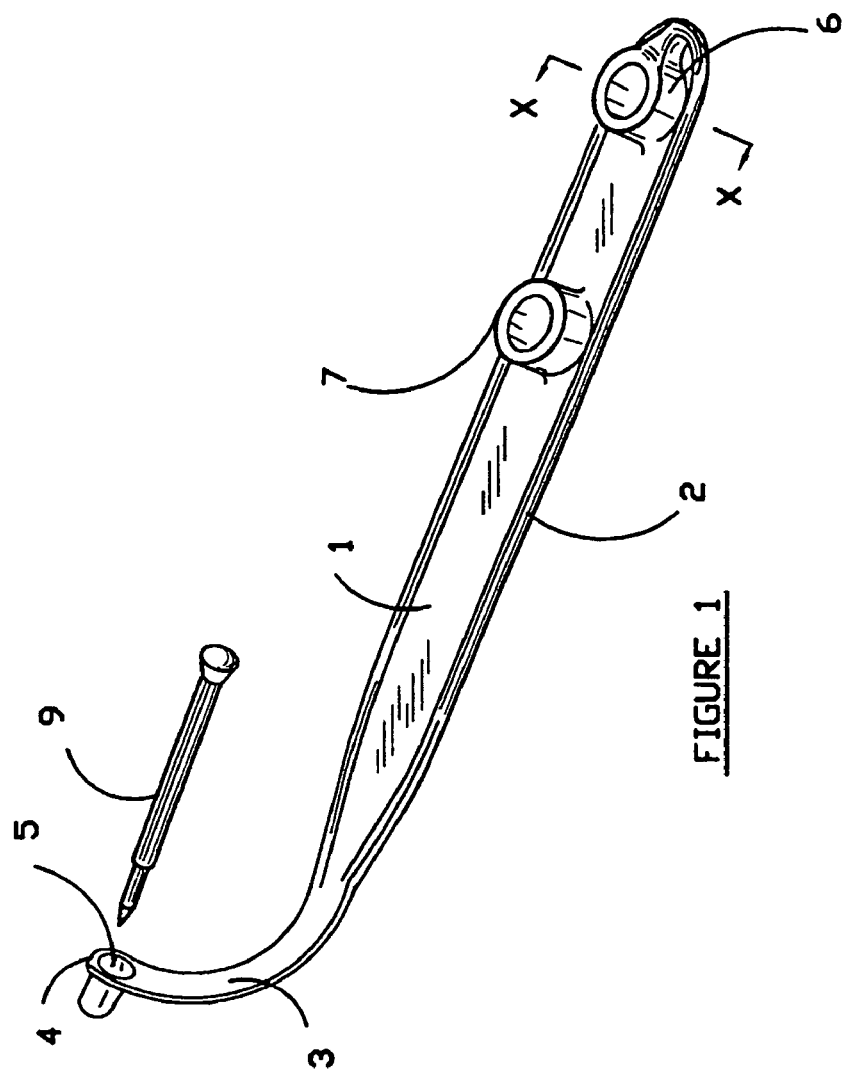
FIG. 1 is a front elevational view of a tag in accordance with the present invention, in its expanded condition prior to use thereof, the drawing further illustrating a possible form of an implanting pin for use in the actual disposition of the tag on an animal.

An improved tag in accordance with the present invention, as shown in FIG. 1 of the drawings, is of a unitary construction and may be formed from any suitable material, as for example a plastics material of any given type. It should be realised, however, that the actual material of construction is not of the essence of the invention. The overall tag, generally designated 1, includes a body portion generally designated 2, being substantially elongate in shape, having extending from one end thereof a neck member 3, which is preferably of a reduced lateral dimension when compared with the remainder of the body portion 2, terminating in a stem member 4. The stem member 4 shown is preferably in the form a shaped extension, protruding substantially normally to the lateral surface of the neck member 3, and having a blind bore 5 formed therein. It is shaped in the form of a head which is readily adapted to penetrate the skin of an animal to which the tag is to be applied. At or in the vicinity of the area of transition between the wider part of the body member 2 and the neck member 3 there may be provided at least one elongate slot, hole or aperture (not shown) extending through the body member 2 itself, such as to facilitate bending to in turn facilitate installation. In an alternative embodiment, again not shown, in that transition area there may be provided or included at least one line of weakening; thereby facilitating bending thereof and ultimate installation. At or in the vicinity of the other, free end of the body portion 2 there is provided a locking member 6 adapted, in use to co-operate with the neck member 3 and associated stem member 4, whereby to allow for locking of the overall tag 1 in place relative to an animal. The main body portion 2 also includes an opening aperture, slot or weakened area 7. The opening 7 may be shaped so that it can be used to grip the stem member or penetrating head 4 to hold it in place in a "cocked" configuration prior to attachment of the tag. During attachment of the tag the stem member 4 is subsequently pushed through the opening 7 as will be described in more detail hereinafter with reference to the other drawings. The opening is also adapted, in use, to allow the narrow end of the extension 5 of the stem member 4 and associated neck member 3 to be threaded or passed therethrough during application of the tag. The free end of the stem member 4 forming the head, in the embodiment shown, is adapted in use to be received and releasably retained by the locking member 6 provided at or in the vicinity of the other end of the body member 2. The arrangement is such that, when the free end of the stem member 4 is located within the locking member 6, interaction between mating components prevents ready separation thereof.

Figure 2:
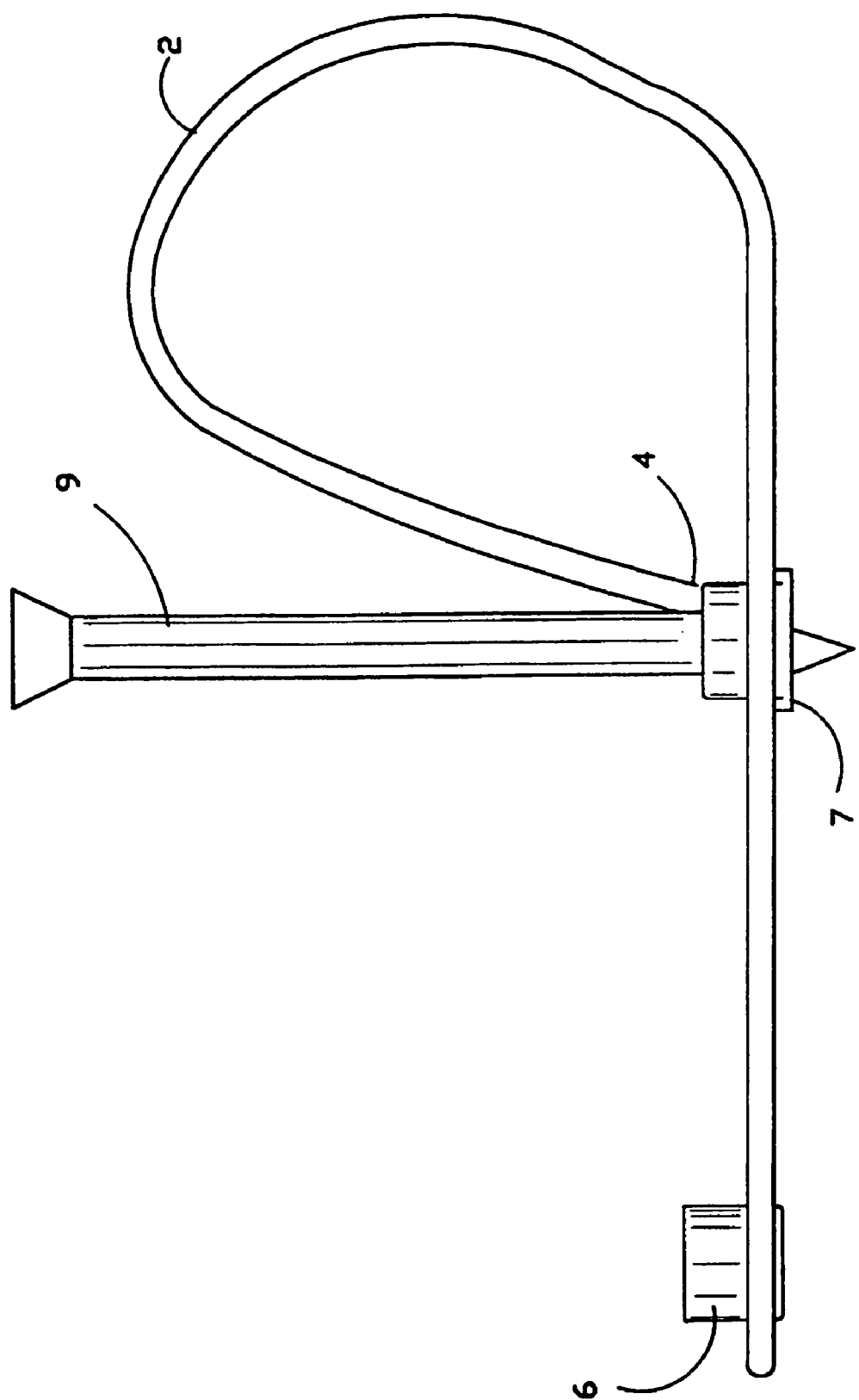
FIG. 2 is a side view of a tag in accordance with the invention, in the configuration prior to disposition on an animal, showing the mode of co-operation required between the implanting pin and the tag itself.
Figure 3:
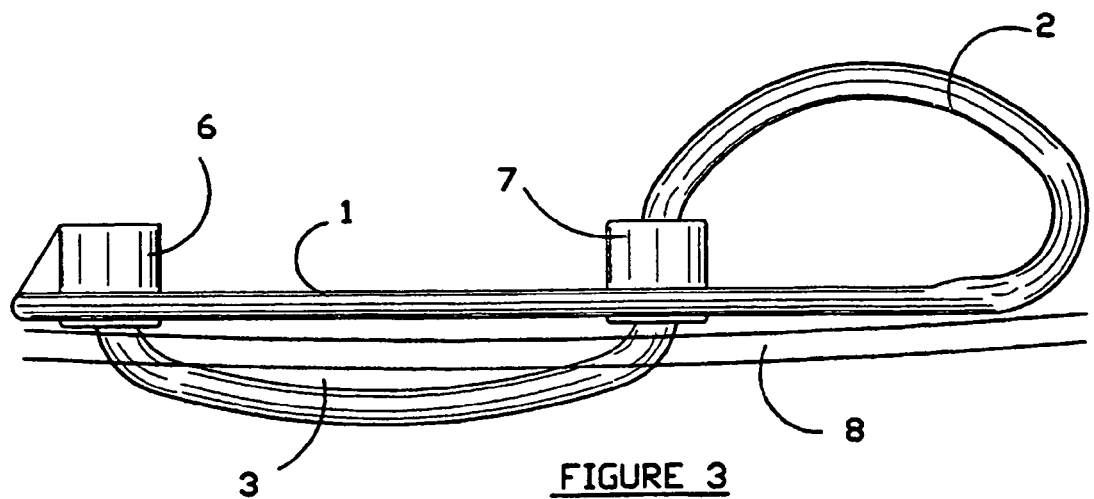
FIG. 3 is a side view of a tag in accordance with the present invention, as disposed through a skin fold of an animal.
Figure 3A:
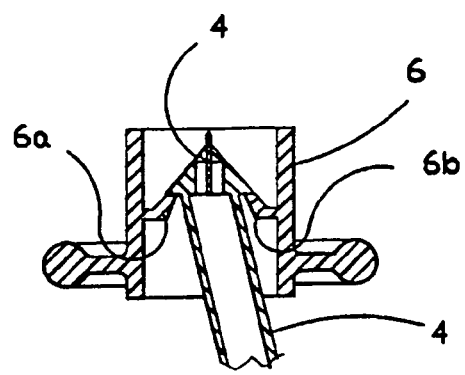
FIG. 3a is a vertical section taken through the locking member 6 shown in FIG. 3.
Figure 3B:
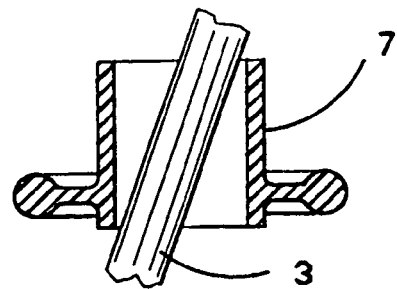
FIG. 3b is a vertical section taken through the opening construction 7 shown in FIG. 3.

Referring to FIGS. 2, 3, 3a and 3b, a tag 1 has been applied to the skin of an animal as shown in FIG. 3 by initially setting up the tag in a partially "cocked" configuration as shown in FIG. 2 with the stem member 4 located in the opening construction 7 and the implant pin 9 in place above the stem member ready to press down on the stem member. To get to the configuration shown in FIG. 3, the locking member has been bent backwards so that it has been located directly beneath the opening construction 7 and the skin 8 of the an animal has been pinched and folded so that it has been located directly beneath the opening construction 7 and the skin 8 of an animal has been pinched and folded so as to form it into four superimposed layers as is the case when the ear is folded. The implant pin has been pushed down to drive the stem member 4 through the four layers of skin to be received in locking engagement with the locking member 6. The resilient projections 6a and 6b bend out of the way as the head is inserted and move back to prevent the head of the stem member 4 being pulled out of the locking member. The natural resilience of the plastics material comprising the tag then urges the tag to unfold to assume the double loop configuration shown in FIG. 3. In this configuration it can be seen that the neck portion 3 of the tag penetrates two superimposed layers of skin, such as may be found on the ear of a cow, at two locations to provide a very secure attachment which is not readily susceptible to accidental removal. Where the attachment is to the ear of an animal it is preferred that the attachment be such that the neck portion 3 becomes secured on the back of the ear, as this has been shown to provide the most likely area where an animal can find purchase by rubbing to remove the tag.

Figure 3C:
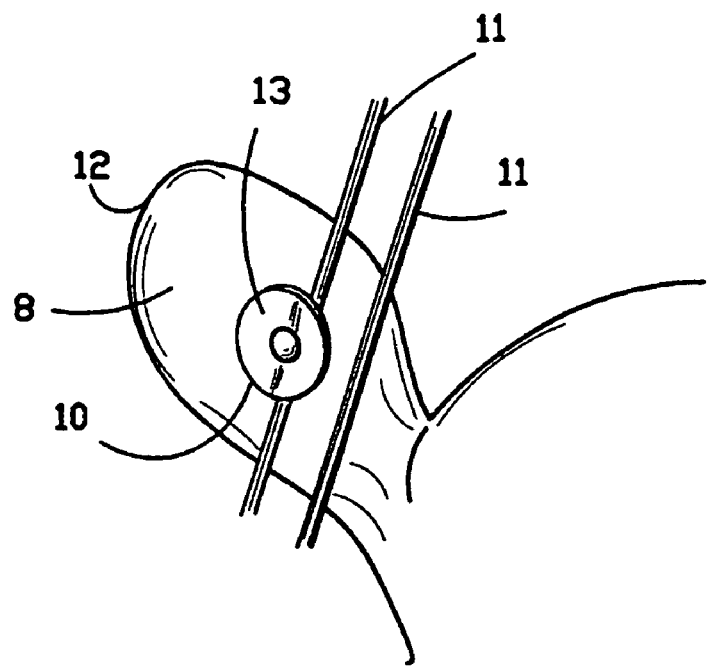
FIG. 3c is a sketch of a conventional tag applied to the ear of an animal rubbing its ear against the wire of a fence.
Figure 3D:
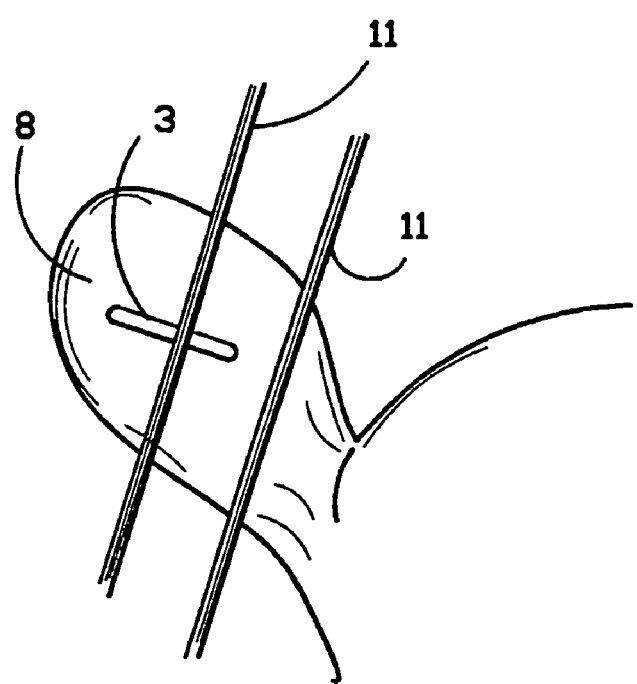
FIG. 3d is a sketch of a tag according to the invention applied to the ear of an animal rubbing its ear against the wire of a fence.

Thus for example it can be seen that the tag of the invention when it is applied in the manner shown in FIG. 3d through the skin 8 of the ear 12 of a cow, does not provide any purchase for the wires 11 of a fence or equivalent to catch under the tag and force its removal when an animal rubs the back of its ear against the wire. By comparison, a conventional tag 10 as shown in FIG. 3c by having a locking member 13 and by the nature of the one point attachment to the ear, this allows the animal to bring the wire between the ear and the locking member. This can often provide sufficient purchase to allow the animal to remove the conventional tag.

Figure 4:
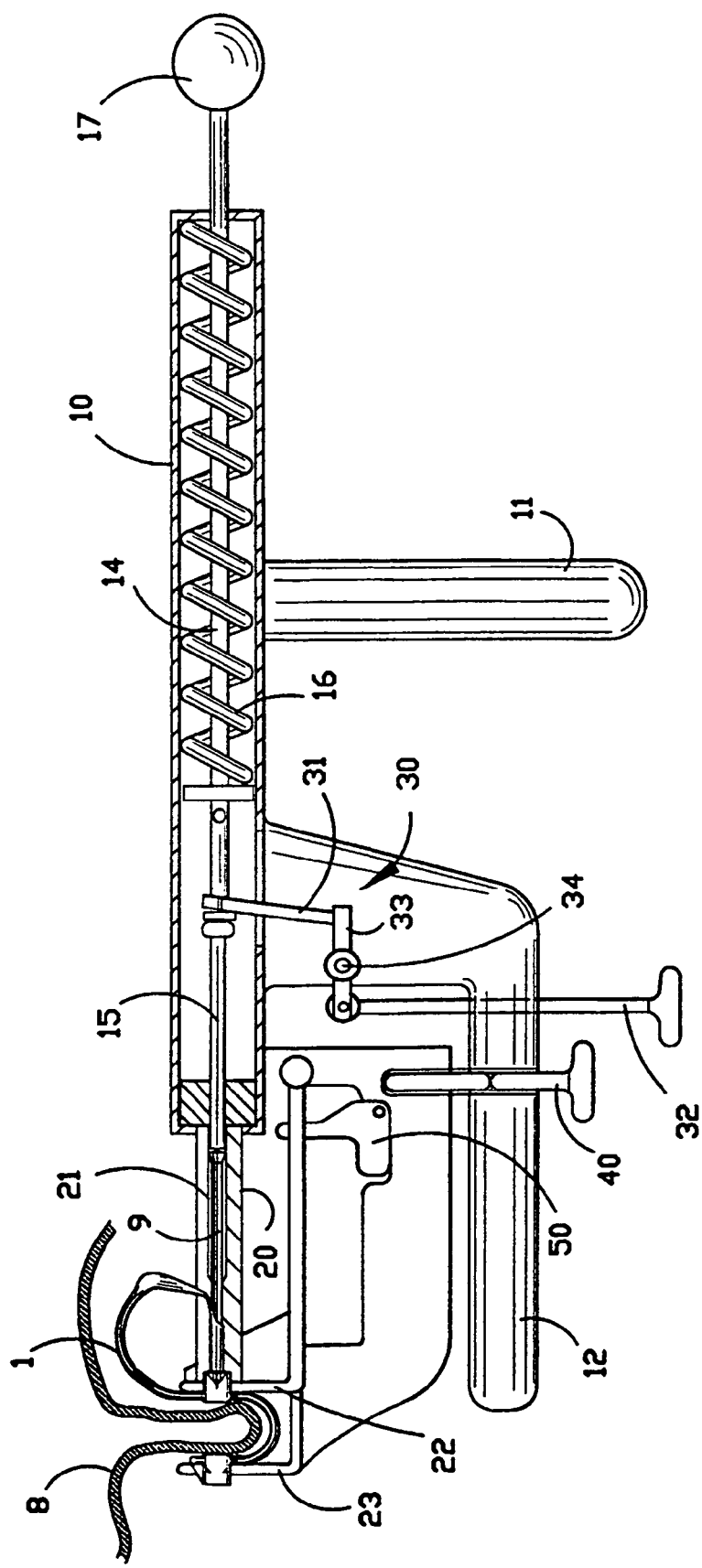
FIG. 4 is a sectional view of an apparatus in accordance with the present invention for use in the disposition of a tag on an animal, showing a skin fold in position prior to the formation of a hole therethrough.
Figure 7:
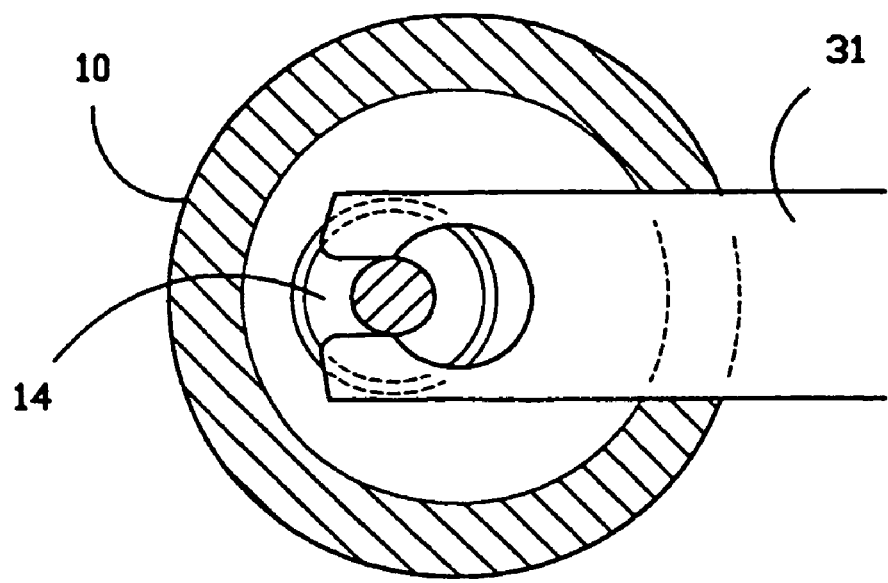
FIGS. 7 and 8 are sectional views taken along the lines 7—7 and 8—8 in FIG. 5.
Figure 8:
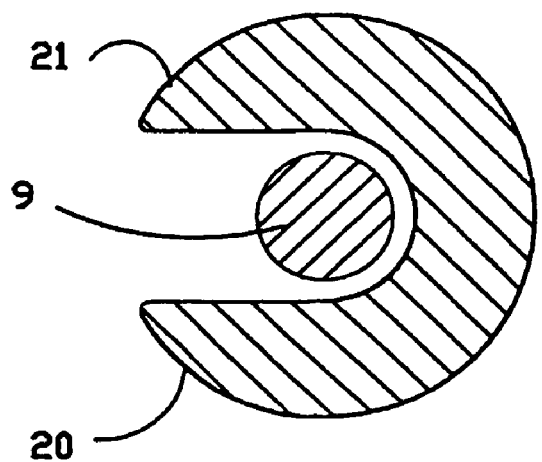

With reference now to FIGS. 4 to 8, there is shown therein an embodiment of an apparatus for application of a tag in accordance with the present invention. The apparatus includes a main body portion or a barrel 10 substantially cylindrical or parallelapipedal shape when viewed in cross-section. As shown in FIG. 4, the barrel 10 has respective front and rear handle means 11 and 12 extending substantially normally therefrom. The barrel 10 has housed therewithin, for controlled reciprocating movement as and when desired, a driving member 14 and driven member 15 respectively, movable longitudinally within the main body portion 10 between the positions shown in FIGS. 5 and 6. The respective driving and driven members 14 and 15 preferably are in the form of elongate rod-like members or pistons disposed substantially centrally of the barrel 10 and adapted, in use, to be in the driven connection in a manner to be described in more detail hereinafter. The driving form for said reciprocating movement is preferably provided by a compression spring 16 (or the like biassing means) disposed within the barrel 10 and fixedly connected to the driving member 14 in any suitable manner and using any suitable means. However, other means are equally usable, as for example airoperated, hydraulically or pneumatically operated means of any suitable type. In the preferred embodiment shown in FIGS. 4 to 6 one end of the compression spring 16 is attached, as for example by pinning to the driving member 14, with the other end of said compression spring being attached, in any suitable manner, to a priming or cocking mechanism, generally designated 17. The principle of operation is that the cocking mechanism, in the form of a hand grip of a substantially spherical shape, attached to the other end of the driving member 14, when moved in the direction of the arrow, gives rise to compression of the spring 16.

At the free end of the barrel 10, remote from the cocking means 17, there is attached a further elongate member 20, preferably of substantially semi-cylindrical shape when viewed from the end, such having an elongate slot or channel 21 extending along the length thereof. In use the slot or channel 21 is adapted to receive, and releasably retain for controlled movement therealong, an implant pin 9 of the type illustrated in FIG. 1. At the end of the further member 20 remote from the barrel 10 are located opposed, relatively moveable jaw members 22 and 23, adapted in use to have located therebetween a skin fold of an animal into which a tag in accordance with the present invention is to be located. Preferably one of the jaw members will have an anvil means 25 associated therewith, to assist in disposition of the tag.

In order to allow for retention of the driving member 14 in the "loaded for discharge" position or configuration as shown in FIG. 5, there is provided a release mechanism, generally designated 30. Such release mechanism is made up of a first elongate member 31, a second elongate member 32 and a cantilever member 33 interconnecting such elongate members 31 and 32. In the embodiment shown in FIG. 4, the cantilever member 33 is pivotally attached to the handle means 12, as for example by pinning it at 34. The opposed ends of the cantilever member 33 may then be preferably fixedly, yet releasably, attached to the respective elongate members 31 and 32. The arrangement is that, when the elongate member 32 is moved in the direction of the arrow (see FIG. 4), such movement gives rise to movement of elongate member 31. In the embodiment illustrated the free end of the elongate member 31 is adapted to, in one location, extend through an aperture or the like disposed at a position removed from the innermost end of the driving member 14. Alternatively, a free end of the elongate member 31 can be adapted to be selectively laterally movable of the barrel 10, into and out of engagement with the innermost end of the driving member 14. Actuation of the release mechanism 30 can be achieved either manually or automatically. When the elongate member 31 is moved out of engagement with the driving member 14, such driving member 15, then functions to drive the associated skin penetrating head of stem member 4 of tag 1 through a skin fold 8 of an animal, to allow for installation thereof.

The apparatus further includes means, generally designated 40, allowing for selective release and opening of the tag loading section, as by allowing for relative movement between the respective jaw members 22 and 23 thereof.

Finally, the apparatus includes means, preferably in the form of a trigger means 50, which functions to allow for compression of a skin fold of an animal between the jaw members 22 and 23, ready for installation of a tag in accordance with the present invention.

Figure 9:
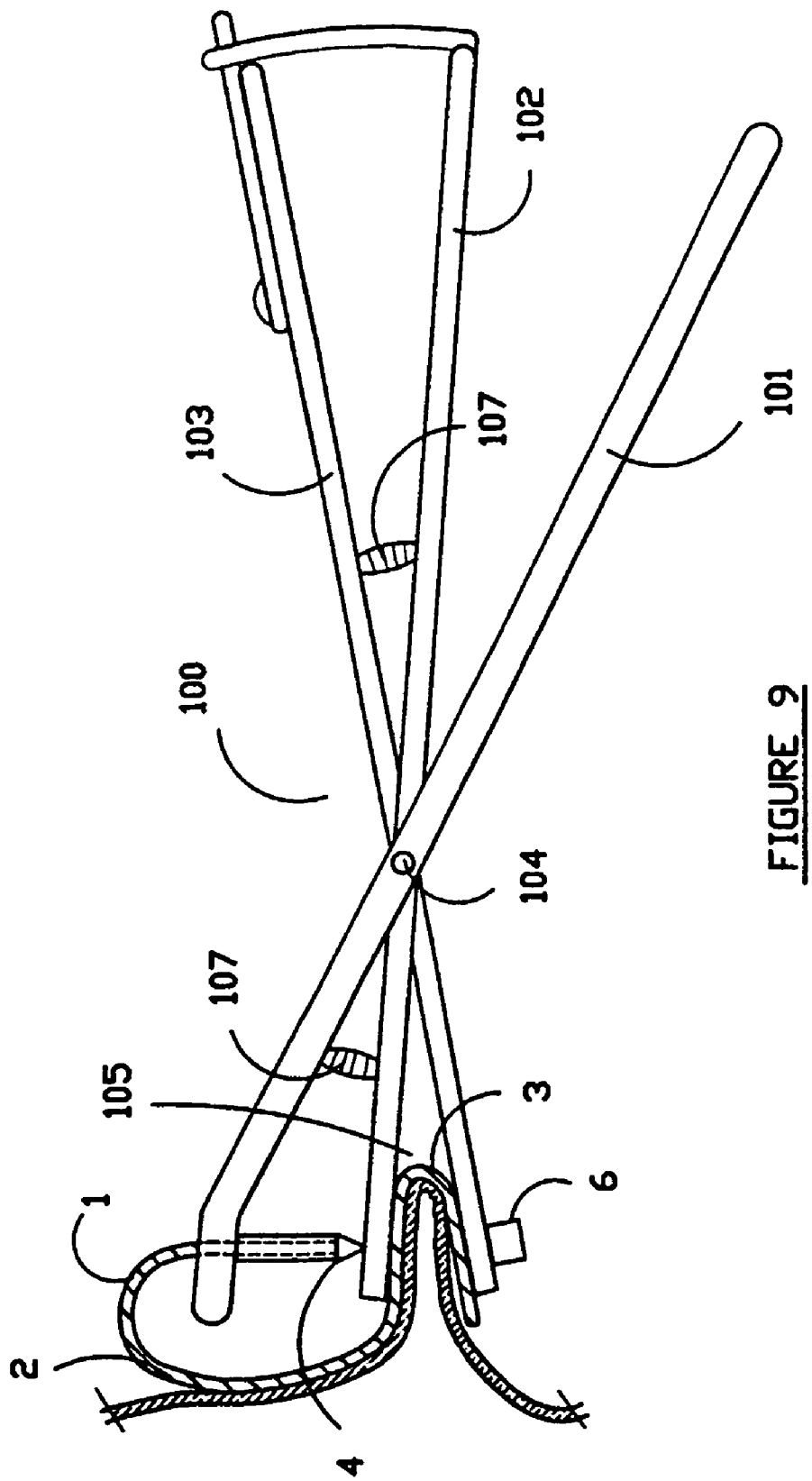
FIG. 9 is a side view of a further possible embodiment of an apparatus (applicator tool or gun) for application or installation of a tag in accordance with the invention, having such a tag in place thereon.

With reference now to FIG. 9, a further preferred embodiment of an applicator tool for the implanting of a tag in accordance with the present invention is shown therein, such tool being suited for the installation of such tags in smaller animals, as for example pigs, deer, sheep and other animals. This application is especially suited for installation of a tag in an ear of such an animal. The tool, generally designated 100, includes three principal components 101, 102 and 103 respectively, pivotably connected at 104 in any suitable manner and by any suitable means, as for example by pinning. Members 102 and 103 each have, at or in the vicinity of one free end thereof, an open section 105, such forming therebetween a jaw means or anvil for receiving a pinched skin fold or skin of an animal for implanting therethrough of a tag. The member 103 includes an aperture adapted, in use, to receive and releasably retain the locking means 6 of a tag. Preferably members 102 and 103, and also member 101 and 102, can be interconnected by suitable resilient means, as for example a spring or the like 107. In the preferred embodiment illustrated means are provided which allow for relaxation of members 102 and 103 once a tag has been implanted into the skin, thereby to allow for further use of the applicator tool as and when required.

In operation a fold of skin is located between the members 102 and 103 as shown, with the interposition therebetween and therein of the body portion 2 of a tag in accordance with the invention. The final locking means is located through the aperture of the arm 103, whilst the neck member 3 and associated stem 4 including a head (with or without cutting blade) are adapted to be threaded through an aperture provided in the member 101 and an implanting pin appropriately located on the applicator and, in use, adapted to be placed into, or within, the lumen which constitutes part of the hollow stem. The members 101, 102 and 103 are then actuated in any suitable manner—as for example by hand pressure from the user—to bring such members into substantial juxtaposition, thereby causing the head and associated cutting blade to penetrate the fold of skin and enter into the locking means, to be then affixed therein against unwanted removal. Relaxation of hand pressure then causes the member 101, 102 and 103 to separate—due to spring action—in turn allowing for removal of the skin fold, with tag now implanted therein to produce an assembled tag such as that shown in FIG. 10.

Figure 10:
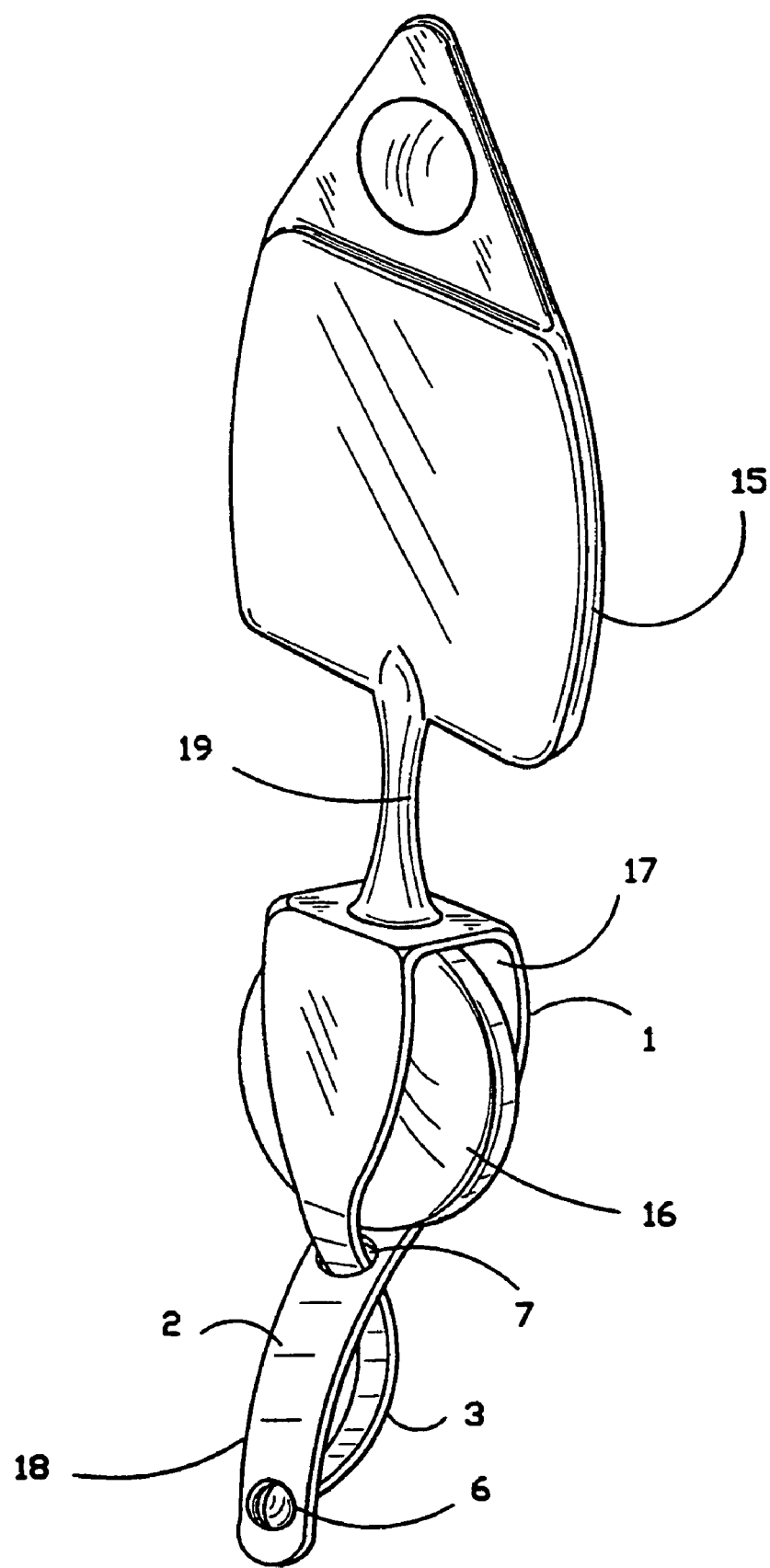
FIG. 10 is a further view of a tag in accordance with the present invention, as it appears in use, with a further or ancillary identification means, label or the like associated therewith.

In FIG. 10 the tag 1 includes the components of a body 2 neck member 3 locking member 6 and opening 7 assembled to form two loops 17 and 18. Loop 17 may be used to hold any form of desired device such as a transponder 16 which may give information concerning the location, identity, physical state or any other aspect of the animal being tagged. Loop 17 may also have attached thereto any other component such as the flag 15 joined via the extension 19. The flag may include information in any form (eg. a barcode), related to aspects of the animal. The extension may be joined by a swivel connection to the first loop 17 of the tag 1. The second loop 18 of the tag 15 is secured to the skin of an animal in the manner illustrated with reference to FIG. 3.

Figure 1A:
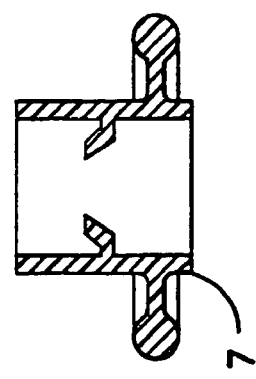
FIG. 1a is the cross-section X—X through FIG. 1.

Alternative forms of tag in accordance with the present invention, are shown in FIGS. 11 and 11b of the drawings. These are also of a unitary construction and again may be formed from any suitable material, such as a plastics material of any given type. The tags generally designated 1, include a body, generally designated 2 having a wider section 2a, being substantially elongate in shape, having extending from one end thereof a neck member 3 terminating in a stem member 4. The stem member 4 comprises a skin penetrating head attached to a hollow portion 4a adapted to receive and co-operate with an implant pin of similar type to that described with reference to earlier figures such as FIGS. 1 and 2. At or in the vicinity of the area of transition between the portion 2a and the neck member 3 there is provided at least one opening, elongate slot, hole or aperture 5 extending through the body portion 2a. At or in the vicinity of the other, free end of the body portion 2a there is provided locking means 6 adapted, in use, to co-operate with the neck member 3 and associated stem member 4 whereby to allow for locking of the overall tag in place relative to an animal. The elongate opening, slot, hole or aperture 5 is adapted, in use, to have the free end of the stem member 4 including the head and associated neck member 3 disposed therethrough. The free end of the stem member 4 is adapted in use to be received and releasably retained by the locking means 6. A flag 15 and transponder housing 16 are attached to the body portion 2a as an integral moulded unit in the case of FIG. 11b and is a separately attachable tag which can be attached by a clip or similar through a hole in the tag body as is shown in FIG. 1a. In the case of FIG. 11c the flag is attached by clip halves 80 and 81 which can be snap fitted around the body 2. FIG. 11d shows how the tag of FIG. 11c would look fitted through the skin 8 of the tail fold of a cow. FIG. 11e shows how the tag of FIG. 11a would look fitted to the ear of a cow.

Figure 12A:
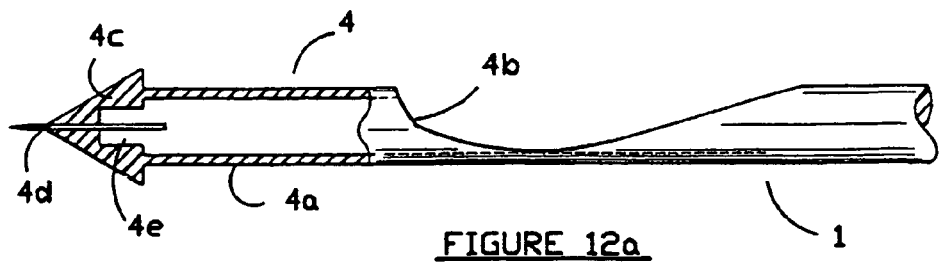
FIGS. 12a to 12d illustrate different views of a stem member and implant pin.
Figure 12B:
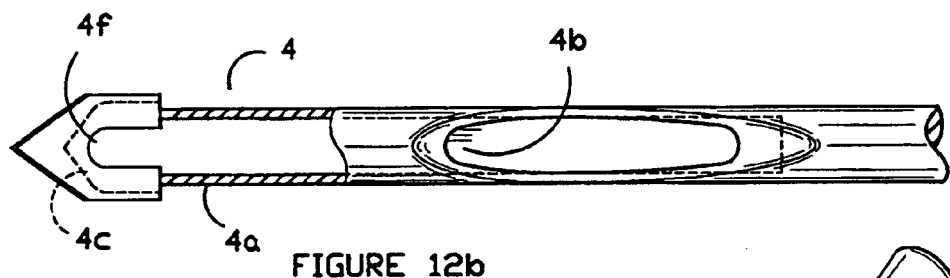
Figure 12C:
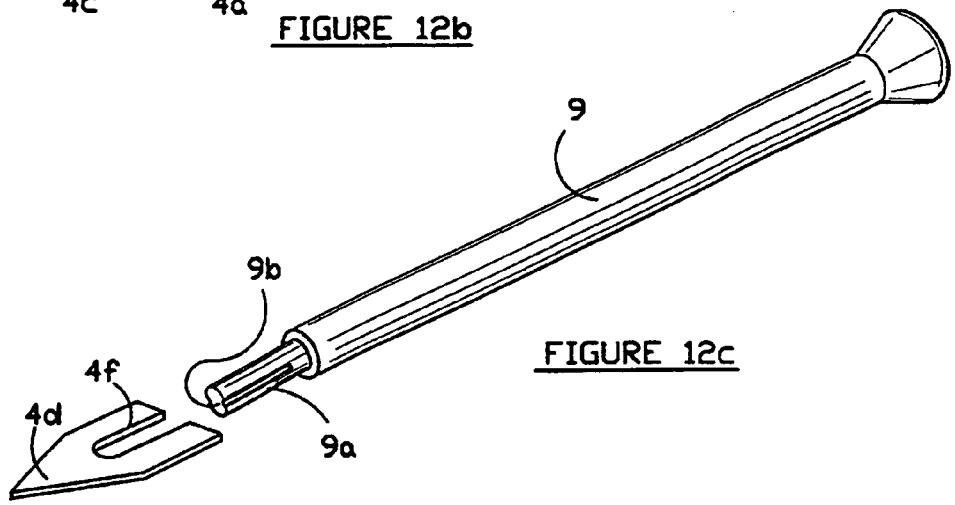
Figure 12D:
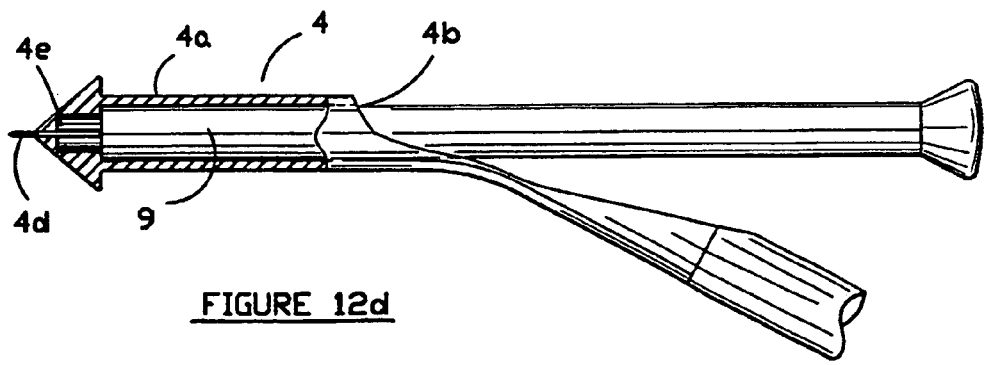

Referring to FIGS. 12a to 12d the stem member generally designated 4 includes a tubular hollow portion 4a which has an access opening 4b for receiving the implant pin 9 in the manner shown in FIG. 12d.

The stem member includes a skin penetrating head 4c at the end thereof. An arrow shaped metal insert 4d with sharp edges is retained in the head to facilitate piercing of skin as the head penetrates the skin. The metal insert may be secured in place during the injection moulding process for forming the rest of the parts of the tag. As the rest of the tag may be formed as a single unit in a one shot injection moulding process, the inclusion of the metal insert during the moulding process can result in the insert being accurately held in position by the material of the tag once the molten plastic forming the tag has been allowed to solidify. Typically the arrowhead sides of the insert will extend for a distance of at least 1 mm, the thickness is, preferably no greater than 1 mm and the maximum width across the arrow head is preferably no greater than 10 mm more preferably 8 mm.

Figure 12E:
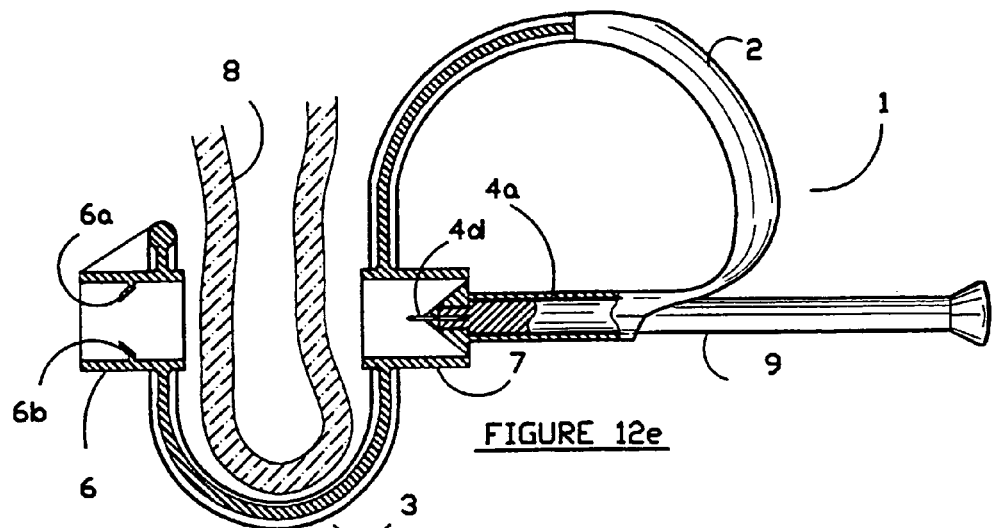
FIGS. 12e to 12g illustrate the application of the tag of FIGS. 12a to 12d to skin.
Figure 12F:
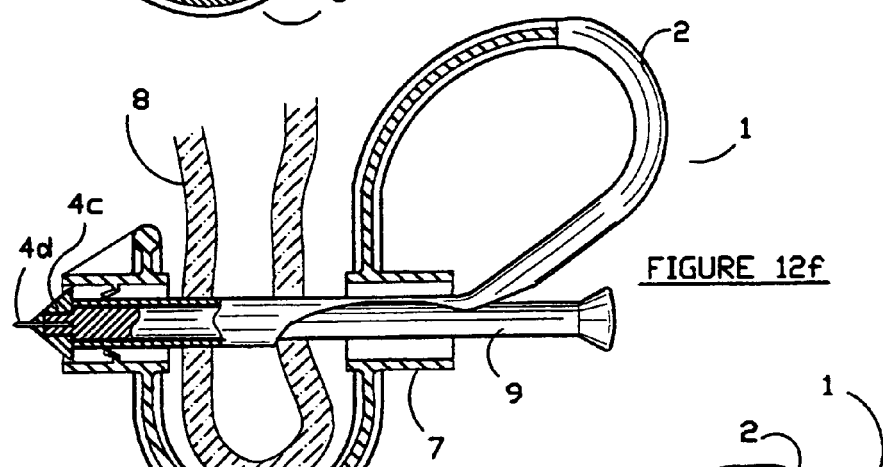
Figure 12G:
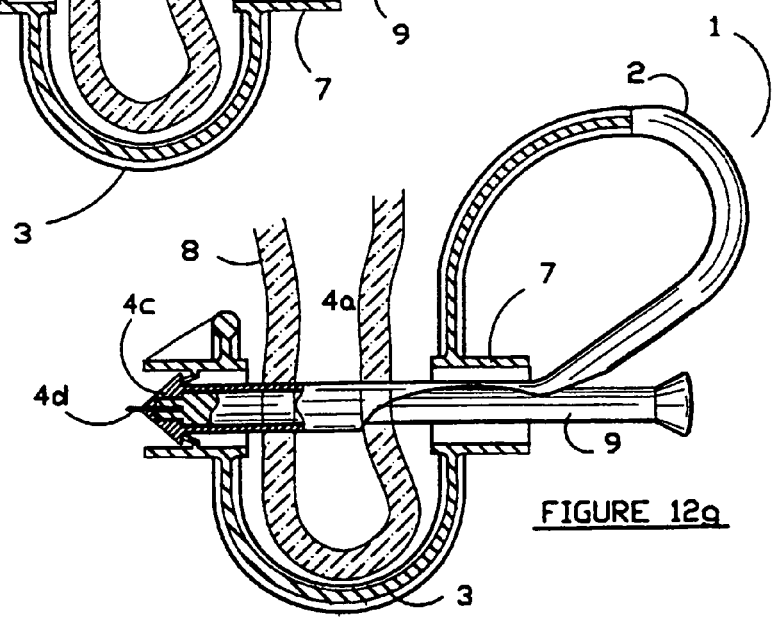

The insert 4d extends into a cavity 4e formed in the head 4c. The cavity is shaped so that the end 9a of the implant pin locates snugly therein. The end 9a also includes grooves 9b which receive the edges of the cut out portion 4f of the insert and brace them against wobble when the implant presses the head through the skin of an animal to maintain direction for the implant pin and cutting head against the resistance offered by the layers of skin. FIGS. 12e to 12g show stepwise how the tag is applied.

Figure 13A:
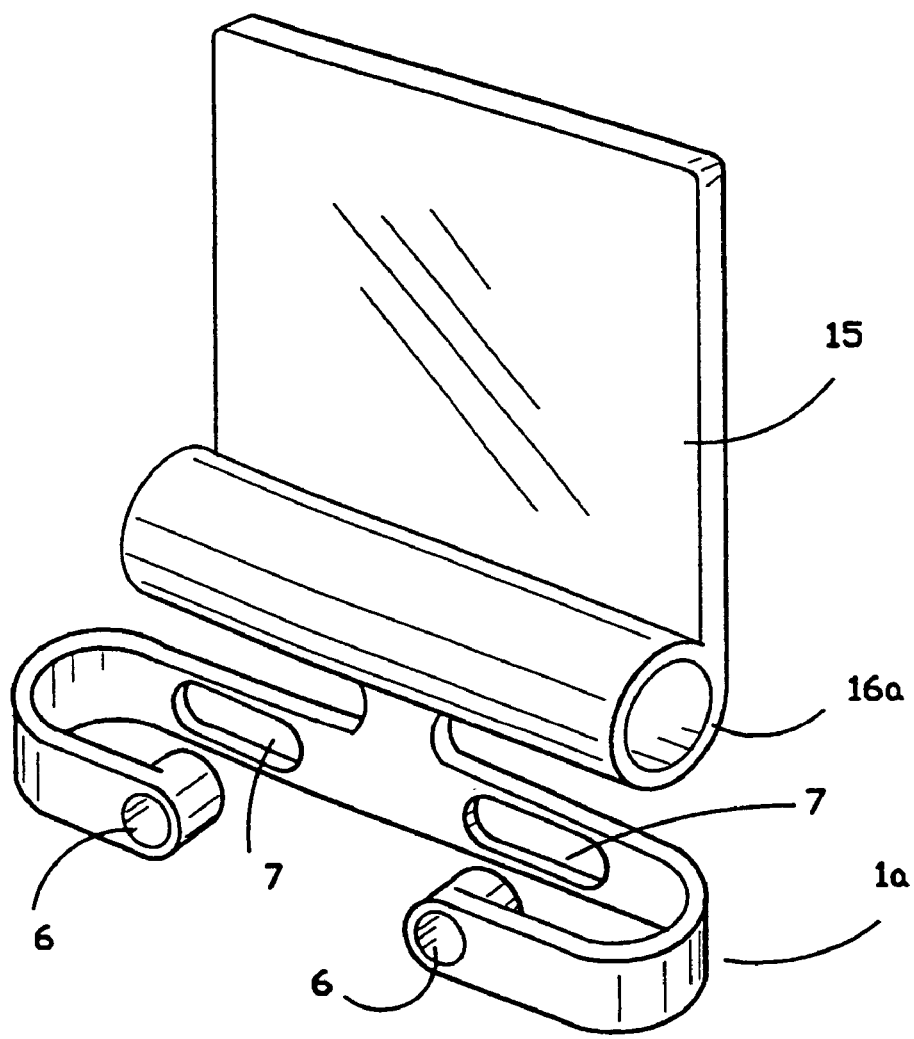
FIGS. 13a to 13c illustrate a two component tag and its applications to the skin of an animal.
Figure 13A:
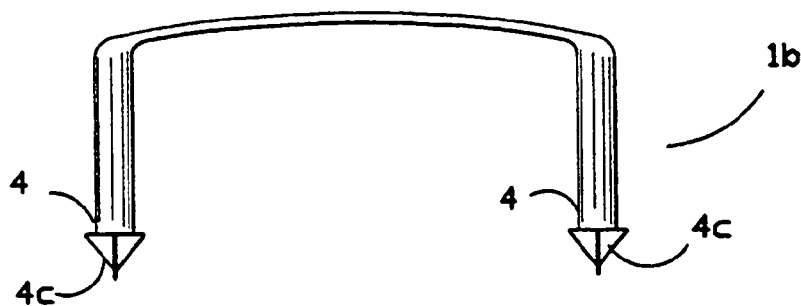
Figure 13B:
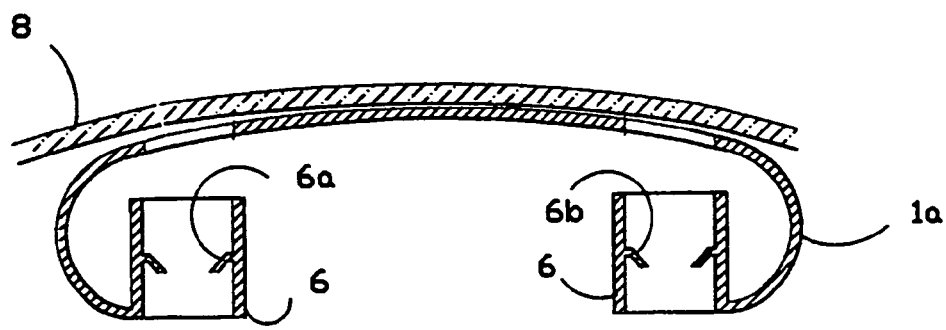
Figure 13C:
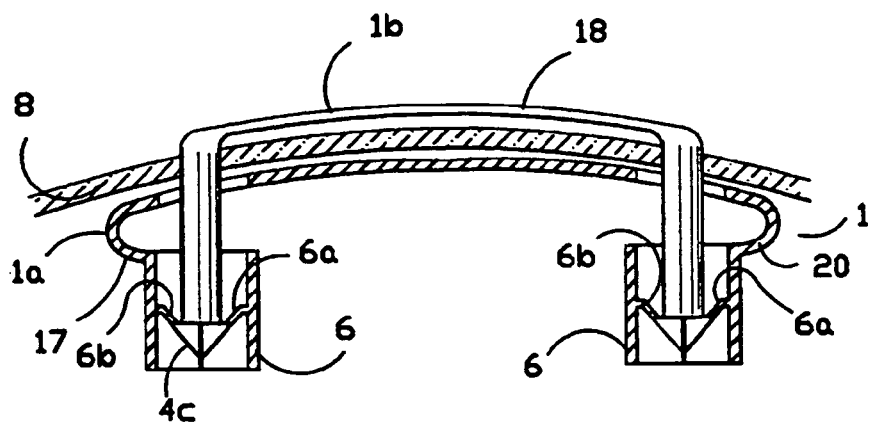

Referring to FIGS. 13a to 13c, the embodiment of a tag 1 shown therein includes two component parts namely a receiving member 1a and a strap member 1b which when assembled in the manner illustrated in FIG. 13c combine to form a tag 1 according to the invention with three loops 17, 18 and 20.

The receiving member is constructed with two locking members 6 provided on both sides thereof. Two openings 7 in the form of slots are arranged so that they are opposed to the locking members. The locking members each include projections 6a and 6b to secure the skin penetrating heads 4c of the strap members in position. A flag 15 and transponder housing or other form of housing 16a are integrally formed with the receiving member.

The strap member 16 comprises two joined stem members each provided with heads 4c. From drawings 13b and 13c it can be seen that the skin 8c of an animal is fitted between the strap member and receiving member which are then pushed together to form the locked configuration shown in FIG. 13c. With the construction shown in FIGS. 13a to 13c the curvatures of the receiving member 1a provide tension and the ability to expand or contract. The two slots 7 provide the scope for the movement required for the neck section of the other component of "the tag" in accordance with the growth of the animal.

The design of this tag is such that the neck sections protrude from the main body of the strap at the extremities or as close as possible to the extremities of the main body. This is so to minimise the risk of inadvertent removal of the strap tag from the rear of the ear, by fencing wire or as in sheep, by shearers hand pieces. As described previously, the stem members can be in the form of shaped extrusions, which each have a blind lumen or bore of variable depth. This allows the implanting pins to be inserted and to direct the penetrating heads through the skin or ear, and into the locking members. The design is not limited to the lumen bore within the neck and head members, nor by the shape of the head members. Underpinning this improvement is the allowance for adjusting the distance between the two piercing parts of the strap at the time of application. For example, when this improved tag is applied to a lamb, the distance between the applicator points as described hereinafter and hence the distance between the two piercing parts of the tag is minimised.

When applied in such a position, the pierced holes in the skin for example of the ear, now hold and maintain the collars and piercing parts at this set distance. As the pierced holes of the skin grow apart as the animal grows, the collars and the piercing parts then follow this movement, whilst still holding the tag firmly in place. Without this mechanism, a two-point attachment tag would only create larger holes in the skin and ears in young stock. This would not be humane for the animal as well as providing insecurity in the attachment of such a tag. When this improved tag is applied to mature or fully grown stock, the distance between the applicator pins and hence distance between the two piercing parts of the tag is maximised. The applicator apparatus that applies the two component tag of FIGS. 13a to 13c can be either manual (hand operated) or impact.

Figure 14A:
FIGS. 14a to 14e and 15a to 15e show the approach for assembling a two component tag along the lines of that described with reference to FIGS. 13a to 13c.
Figure 15A:
Figure 14B:
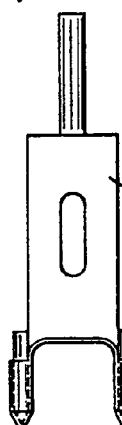
Figure 15B:

FIGS. 14a and 15a show two versions of a double headed implant pin 9a and 9b used to implant the two headed strap 1b of "the tag" shown in FIGS. 14b and 15b. The distance between the drive pins is varied, by means of interchanging the implant pins 9a and 9b. The implant pin 9b is utilized for younger growing stock, whereas the wider unit 9a is used on the ears of mature stock.

Figure 14C:
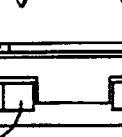
Figure 15C:
Figure 14D:
Figure 15D:
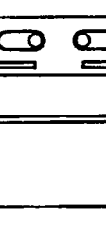
Figure 14E:
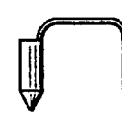
Figure 15E:
Figure 16A:
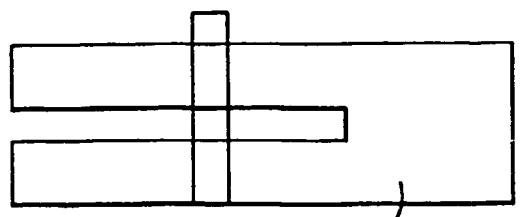
Figure 16B:
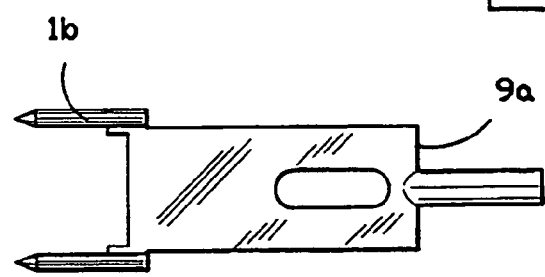
Figure 16C:
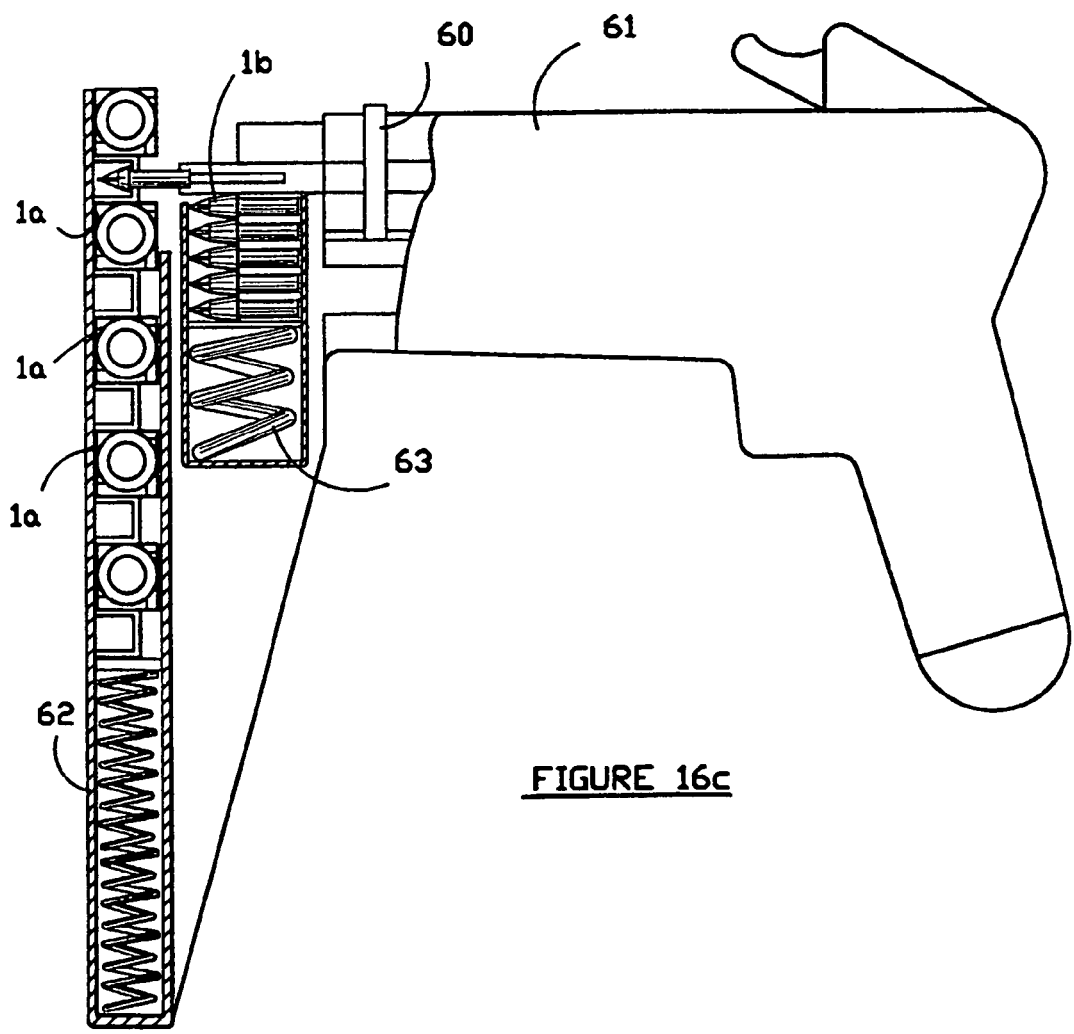

FIG. 16b shows a double headed strap member 1b which has been preassembled with a double headed implant pin 9a. A number of such strap members may be fitted in a cartridge 60 shown in outline in FIG. 16a which can in turn be used to load an automated application apparatus in the form of an impulse gun 61 for assembling tags (see FIG. 16c). The impulse gun is also fitted with a cartridge 62 for holding a number of receiving members 1a as described with reference to FIGS. 13b, 14c and 15c. The cartridges are interchangeable and provide a set distance between the two locking means to match the same distance of the driver head mechanism.

The mechanical drive function of the impulse gun is similar to the application apparatus previously outlined. Tension provided by compression spring is used to "feed" the tags towards the implanting section of the apparatus. In order to suit the distance between the two pins, at the point of application, the driver head mechanism is interchangeable, to match "the tag" cartridges, where the distances between the penetrating heads and the locking mechanisms are predetermined, to suit the application either to young or mature stock.

Tag Applicators

The principle function of the applicator apparatus is to drive the applicator or implant pin, in through the skin including that of the ear, and to lock the head of the strap into the locking mechanism of the tag. The applicator apparatus then holds the implant pin, in order that the implant pin is disposable and designed to be used once, to avoid the potential of spreading infectious agents from animal to animal. In some instances, the implant pin may be used on a repeatable basis. The implant pin can be made of various materials including different grades of steel, plastic and or glass associated products.

Figure 17:
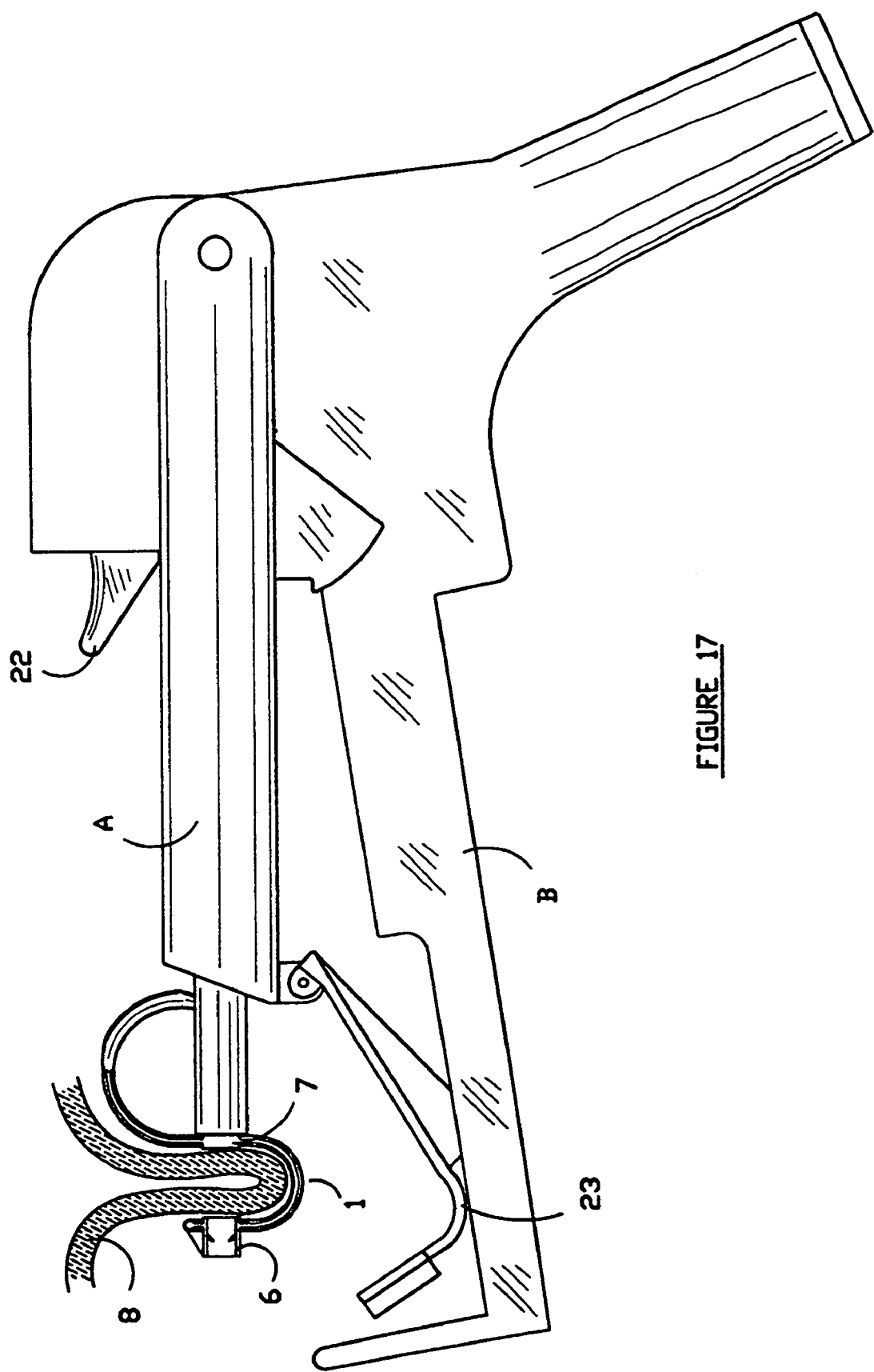
FIGS. 17 to 21 show various elevation views of an applicator in full and in section.

With reference to FIGS. 17 to 21 to 15, there is shown therein a particular embodiment of the apparatus for application of a tag in accordance with the present invention. The apparatus includes two main body portions A & B, when viewed from the side. They are either square, rectangular, cylindrical or parallel pedal shape and are pivoted and joined by rod-like pivot member 20. FIG. 17 shows the position of applicator apparatus, after trigger mechanism 22 has been pressed. Note bodies A & B are now partially separated, but locked by locking member holder 23. The pinched skin or that skin of the folded ear 8, then acts as a holding point, for the implant or applicator pin to be withdrawn from locking member, leaving the head and partial section of collar, captured by locking mechanism and further withdrawal of the applicator pin results in releasing the pin from the guide bush. Once the implant or applicator pin is removed, the skin of the ear resumes its normal position, with tag applied.

Figure 18:
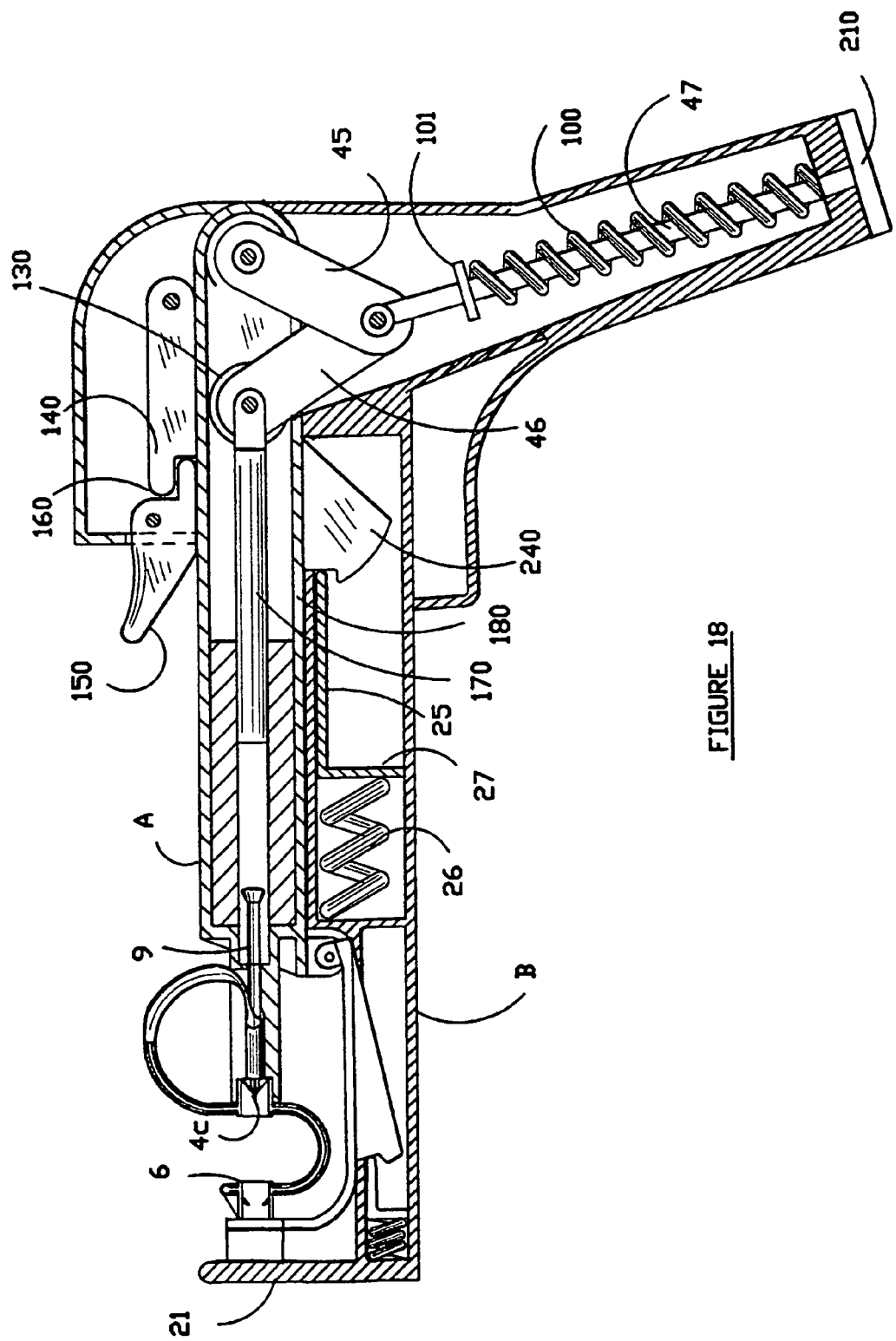
Figure 19:
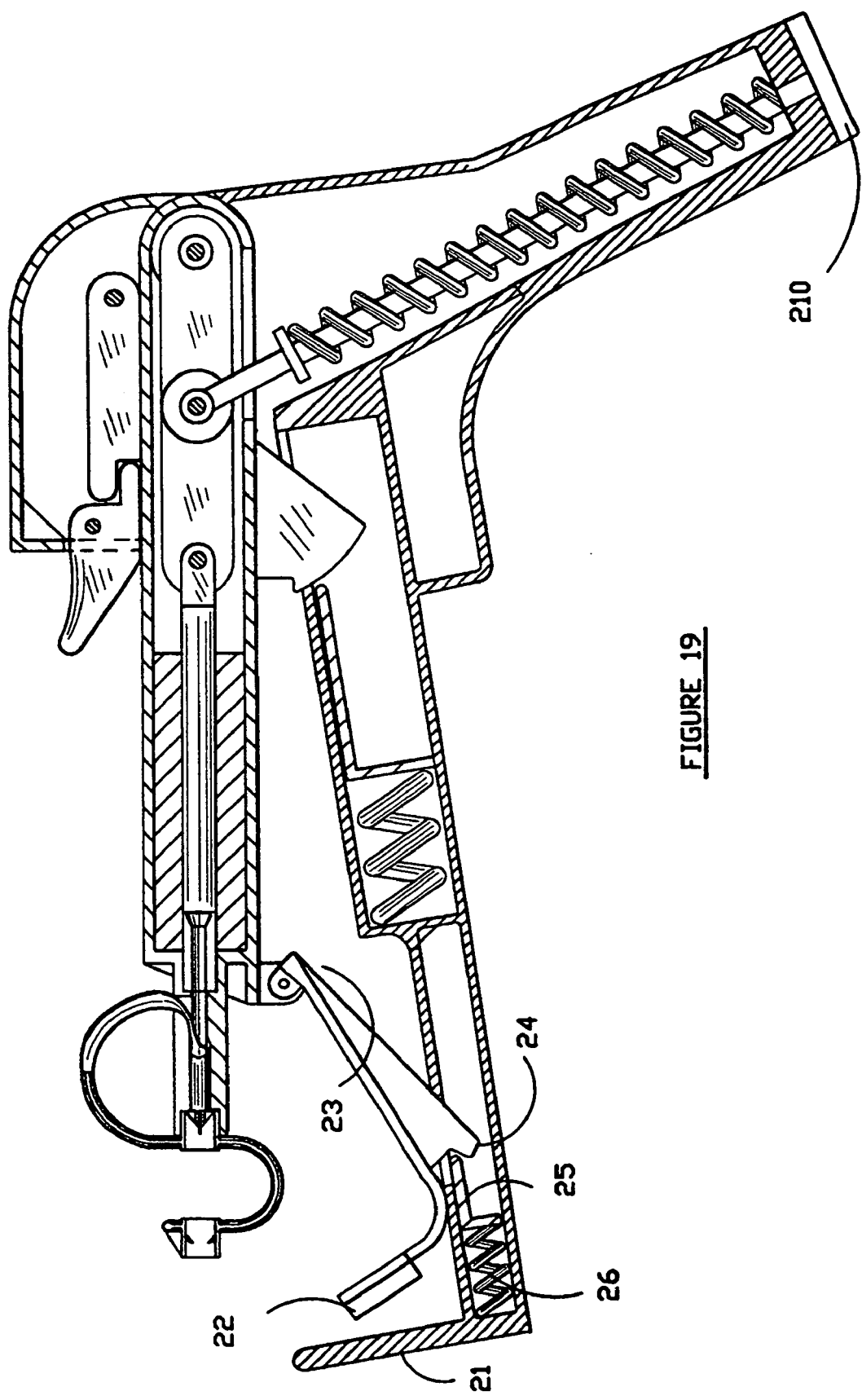
Figure 20:
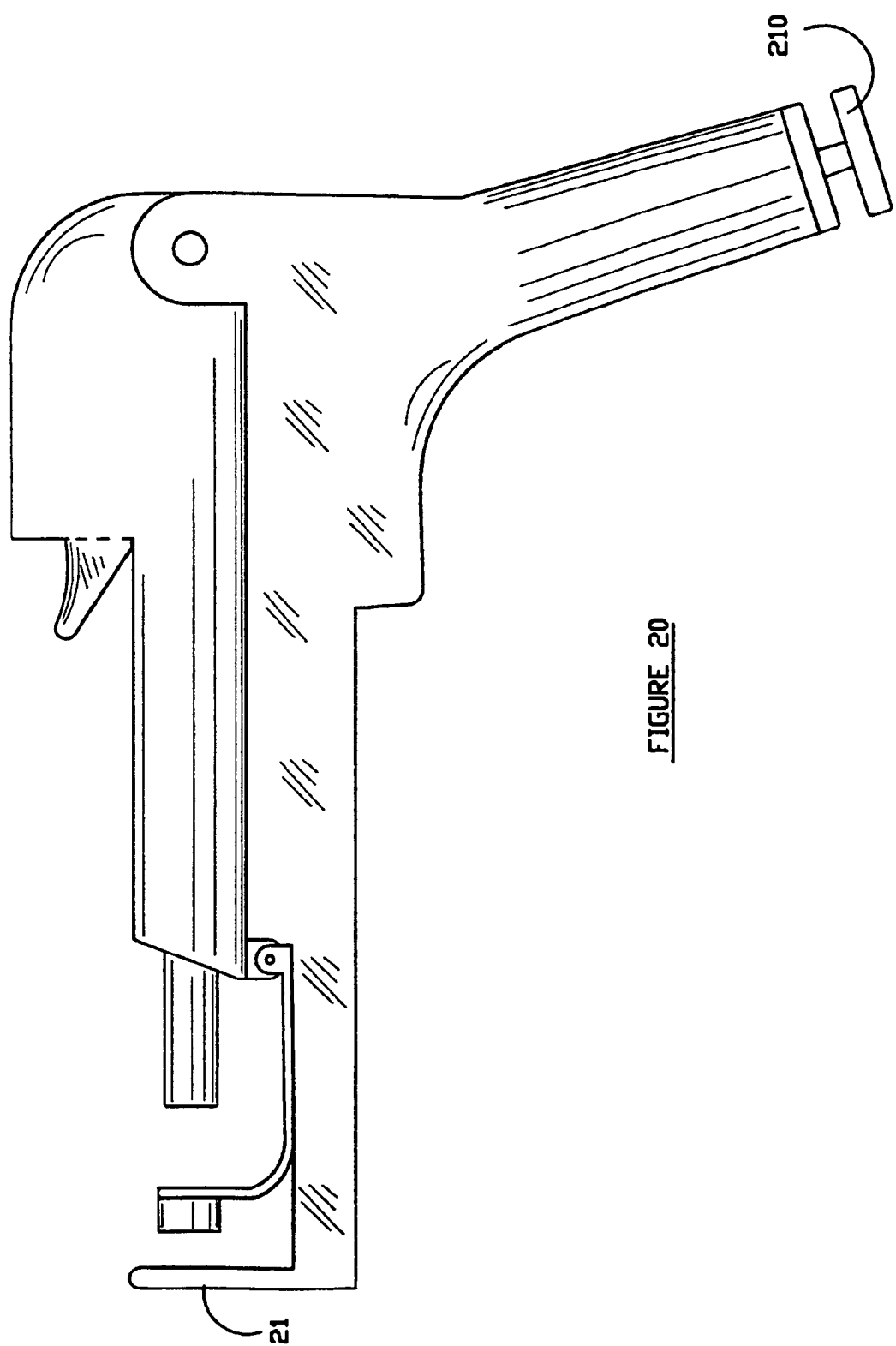

With reference to FIG. 18, there is shown an improved mechanical driving system. The application apparatus improvement is not limited by this, but this is an example of a particular embodiment. There are two coupled sets of linkages 45, 46. The interconnection of the two sets of linkages is attached to the spring driver rod 47. The upper body part 48 of section B provides the support for the collar 49, that forms a stop for compression of the spring or interconnected springs 100. Collar 110 is attached and fixed to spring driver rod in the position shown. The other ends to the coupled linkages 45 and 46 are attached to two thrust support rollers 130. Pin 100 forms an anchor point to linkages 45 and 46 that is also the pivoting point for main body sections A & B. The two thrust support rollers 130 fit neatly within the long internal section of Part A.

In the activated compression state (FIG. 18), the linkage 46 is cocked or stopped by the trigger mechanism 140 and 150. The trigger mechanism consists of two eccentrically pivoted arms 140 and 150 which interconnect at 160. Depression of trigger 150 results in a forward movement of the elongated member 140, which allows the square edge striker block 160 to be released from the second trigger arm, and activate the compressed spring to expand rapidly against collars 49 and 110, acting on spring driver rod 47, to drive thrust supports roller 130 along channel towards the implant pin 9.

The drive member 170 moves longitudinally within body section A. The driven member 170 is preferably in the form of elongate rod-like member disposed substantially centrally of the barrel 180 and is the drive connection either directly to the implant pin (as shown) or to another free fall drive unit (not shown), which is not connected to linkage 46 and is designed to provide the drive connection to the implant pin. This free fall adds more momentum to the system to enable skin penetration of the tag.

The implant pin 29 is struck and drives the tag head 4c into the locking member 6. The final stroke of the impact driver pin 170 allows the locking mechanism between main body members A & B to be released. The remaining compression of spring 10 forces main body members A & B to spring apart (see FIG. 19). The locking mechanism of the tag is resultantly pulled from the anvil 21, and released from locking member holder 22. The locking member holder 22, is pivoted from main body A at 23 and forms an L shape. At the bottom of the L shape, two fork like features protrude to capture the sides of the locking member of "the tag". A shouldered flat section 24 protrudes from the main body of the locking member holder. This shoulder interconnects with a flat long trigger, spring 25, 26 as shown.

The functions of the locking bush holder are:
1. To hold the locking bush of the tag in position for application
2. The locking bush holder is locked with locking mechanism 25, 26, after the applicator tool has been fired to release the locking member in order for the implant pin to be released from its fired position. Now referring to FIG. 18 & FIG. 20 a round flat washer 210 is fixed to the end of spring driver rod 47. This distance along this rod 47 determines the distance of anvil release (ie. how far apart main body A & B are sprung apart). Once released, manual withdrawal of implant pin occurs using the pin attachment within the cylindrical tube with driver rod positioned on head of implant pin. This pin withdrawal is not limited to only this process. By way of another example, facilities for the coupled linkages, when fixed, could be made so that the linkages could push past their fully extended and vertical plane, which would allow the applicator pin to be subsequently lifted, given a claw like attachment when positioned under the base of the applicator head pin (not shown).

Figure 21:
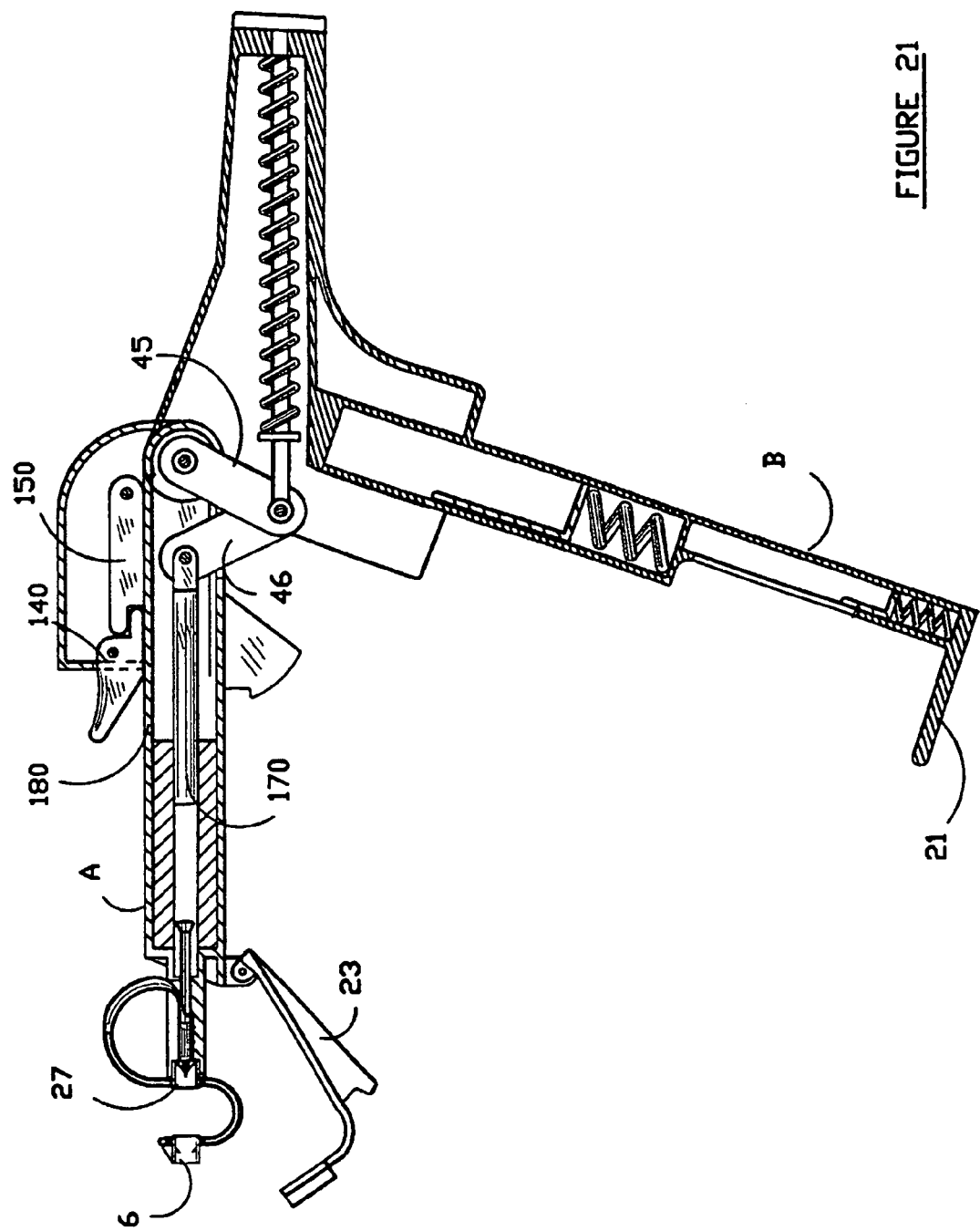

FIG. 21 refers to a preferred embodiment of the applicator apparatus, in preparation and actual lodging of "the tag". The action of mechanically widening the gap between the main body sections A & B results in several functions.

The driver pin 170 is pulled back up the cylindrical structure 180.

The coupled linkages 45, 46 are in their angular orientation (not limited by angle of presentation shown).

The trigger mechanism 140 and 150 is reset and is locked onto the striker block.

The stop 21 and re-set trigger 14, 15 locks the angular orientation of the two main body components. The position of stop 21 along the spring driver rod determines the angle main bodies A & B are orientated. This determines the opening angle, and allows positioning of the locking member alignment guide 23 to locate the locking member, to enable the tag to maintain its curvature between the guide 27 and locking member 6, for tag application.

The locking member alignment guide allows the safe locking of "the tag" in an aligned position. The above features now ensure "the tag" is loaded whilst there is no tension of the main spring. This is an important safety feature.

Locking of the application apparatus is achieved once the tag is mounted, by pushing main body sections A & B together. Once drawn together, the locking mechanism to hold the sections together is activated. Referring to FIG. 18, a wide section with a slightly curved base section 24, attached to main body section A, presses over a long but narrow plate 25, which has a compression spring 26 exerting a positive force, through a thin plate 27. There is a gap between Main Body A and curved section 240, which allows a stop point, created by the plate being pushed into the position via the spring 26. Once engaged, the two main body sections are locked together. The striker 160 releases this locking mechanism at the end of the stroke, by pushing the plate 25 downwards, to release the section 240.

General Discussion

The arrangement in accordance with the present invention has been found to be responsible for a number of important practical advantages, especially when compared with the more conventional animal ear tags as now in use. The advantages associated with the present applicant's arrangement are explained hereinafter in more detail.

Firstly, and by virtue of its actual configuration and location on the animal, the present applicant's tag can afford significantly enhanced readability. In that regard ear tags in accordance with the known art presented limited readability, as for example from the rear of the animal, in a milking shed or place when an animal—such as a cow—is being milked from the side and towards the rear, in laneways, etc. Alternatively, and as is sometimes the case in accordance with the known art when a leg tag is employed, such also affords only limited readability, dependent upon the location of viewing, and especially if covered over or soiled by dirt, faeces, etc.

Perhaps even more importantly the tag is accordance with the present invention, by reason of its very configuration and location on the animal, is improved security against accidental damage or removal. This in marked contrast to the situation with conventional ear tags and other types of tags as are currently in use, which can exhibit a loss rate in excess of 4%, a significant number in real terms, and in fact an unacceptable number for practical purposes.

Thirdly, and by reason of the fact that a tag in accordance with the present invention is designed specifically to be attached at two points within an area of skin, it exhibits much stronger attachment to the animal, again resulting in a minimising of the likelihood of unwanted removal, as could and did happen with the prior art arrangements, for example by rubbing against other surfaces. Further, it must be realised that the single point of attachment evident with conventional ear tags can give rise, with time, to enlarging of the hole to such an extent as to perhaps allow for the overall tag to slid therethrough, resulting in loss of the tag and leaving the animal not as readily identifiable. This possibility is effectively reduced with the tag in accordance with the present invention.

The tag in accordance with the present invention is of especial significance as it provides a means to readily attach other labelling means or markers, providing a means for quality assurance application that can be readily utilised by farmers and/or operators in sale yards and abattoirs. By way of example a cow with a mastitis infection is treated with antibiotics. The cow is normally kept in the herd but she needs to be identified when presented for milking. Her milk is withheld from the main collection area as it contains antibiotics and a special collection bucket or the like is used to collect her milk. In accordance with the prior art practices, one method of distinguishing an infected cow from others was to actually paint the cow, whereby to allow ready identification thereof. The problem was, however, that when the cow was cleared of infection, more often than not the paint was still visible, being difficult to remove therefrom readily. The present applicant's arrangement provides a solution to such a problem by including a facility which allows for location on the tag of a suitable further label or distinguishing means, as for example a coloured marker, which may be readily removed or replaced to suit changing circumstances.

Further to the above, a major advantage of the present applicant's arrangement, for location within an area of skin of an animal, is the facility for many other management systems and/or marking identification devices to be used in conjunction therewith.

It should be realised that a tag in accordance with the present invention can vary considerably, from its front-on look or view, as shown in FIG. 1, to its in situ appearance as shown in other drawings.

Such a tag can self-adjust according to the anatomy of the animal involved, initially at the time of actual installation of the tag, and thereafter, according to changes in the physiology of the animal during its lifetime. Indeed, a tag in accordance with the present invention is a multi-purpose article, which may be designed to allow for changes or variations in:

i) skin thickness of the animal at the time of actual application;

ii) body condition of the animal, as for example changes in fat content or thickness in the subcutaneous tissue; and iii) growth of the animal with time, thus being especially insignificant when a tag is desired to be installed in or on an immature animal.

A tag in accordance with the invention can remain in place on the animal for the lifetime of that animal. However, by allowing for ready attachment thereto of additional tags, identification means or the like, the tag in accord with the invention serves other important functions, without necessitating removal, according to the desires of the owner of the tagged animal. For example if ownership changes, as can often happen, a different identification means can be readily located on the tag. By reason of the preferred location of the tag in accordance with the present invention, at or in the area of the tail fold, the additional of further, or amended or changed, identification information, means or the like can be done simply and easily, even within the limited confines of a cattle race or milking shed. This is in marked contrast to what could be achieved with the prior art ear tags, wherein it was necessary to in effect head-lock the animal to gain access to the ear and associated tag.

Turning again to the drawings it should be noted that, in use, the body portion of the tag is intended to be aligned substantially parallel to the skin fold of the animal. The implanting portion or penetrating head of the tag is placed centrally through the further aperture, and then has two points of attachment to the skin, thereafter again coming into contact with the body portion for engagement with the locking means thereof. By reason of such a configuration and mode of application, the tag when installed is located relative to the surface of the skin of the animal in an extremely stable manner. The thus installed tag will therefore be substantially proofed against unwanted movement relative to the animal, as for example rotation, being movement of a type which was all too readily possibly with the prior art tags. In fact, the operator/installer may have total control over how a tag in accordance with the present invention is disposed on a given animal.

In the result, a loop formed by the tag located external to the skin or skin fold allows for ready and continuous variation in the location relative thereto for additional marking or information devices. Such caters for variations which could possibly exist—from one animal to the next—in the angle or inclination of the skin into which the tag is to be inserted or implanted. By way of example only, the angular variation of the skin may be as much as 90° in the vertical plane. With the present tag, the operator/implanter can select the angle of attachment relative to the area of pinched skin, hence maintaining the tag in its optimum position on the animal in terms of readability, access, etc., effectively independent of the animal's anatomy.

In accordance with the known art electronic marking or identification means have been employed, for location on or in an animal of any given type. In actual fact at least three electronic identification systems presently exist. These include a microchip placed in an ear tag, a microchip placed in the stomach or rumen of the animal and/or a microchip placed on a necklace or the like, to be located around the neck or throat of the animal. Each of these, however, has been found to suffer from a number of disadvantages. Firstly animals must pass through a reading station individually and at a limited speed. Secondly the reading station or scanner must be able to cover a wide area, by reason of the fact that the head and neck of the animal should be in different positions as different animals pass through the scanner. When one bears in mind that there may be a tendency for more than one animal to enter a shed or the like at substantially the same time, there is a likelihood of inaccuracies in reading when electronic means of identification are employed. The present applicant's arrangement, however, especially when located in a tail fold position, ameliorates the aforementioned disadvantages, principally by reason of the fact that, from animal to animal, the tag in accordance with the present invention can be located at substantially the same height and position, not only facilitating reading but also eliminating any problems which would have been caused previously be having more than one animal enter the scanning area at the same time, since the scanning equipment can be more accurately directed when compared with the prior art arrangements.

In a situation wherein a microchip was located within the rumen of an animal, such also gave rise to problems in terms of retention rate and actual readability. These problems are to all intents and purposes ameliorated when a tag in accordance with the present invention is positioned on the tail-fold of the animal. In actual fact with the present application's arrangement the process of electronic identification or monitoring of animals can become more simple and significantly more reliable.

In terms of actual visual identification applicant's arrangement, as distinct from electronic identification, can be responsible for significant advantages. In that regard it should be realised that most procedures carried out on animals, as for example milking with cows, artificial insemination, pregnancy testing and often therapeutic treatment, are conducted from the rear of that animal. It therefore makes sense to utilise means which allow for ready identification of the animal from the rear, rather than to have to look elsewhere on the body of that animal.

A further advantage associated with the present applicant's arrangement results from a tag in accordance with the present invention having the facility to have associated therewith and attached thereto other devices, as for example a pressure sensitive device of any given type. When the animal involved is a cow, for example, the incorporation of such a pressure-sensitive device on the tag located within the tail-fold area will indicate when the cow has been served or mounted, hence affording an indication as to whether or not a cow is in season and/or is ovulating. Such constitutes an extremely important facility and associated advantage for purposes of herd management. In that regard it should be realised that many cattle in Australia are artificially inseminated. It therefore becomes imperative for the farmer/herd owner to be able to determine readily when a cow is in season.

It is to be understood that the word comprising as used throughout the specification is to be interpreted in its inclusive form ie. use of the word comprising does not exclude the addition of other elements.

Finally it should be understood that the aforegoing description refers merely to be preferred embodiments of the present invention and that variations and modifications will be possible thereto without departing from the spirit and scope of the invention.

The invention claimed is:

1. A tag for attachment to an animal ear comprising:
   a penetrating component having two spaced apart ear penetrating members joined by a central section extending therebetween the penetrating members each having a stem portion extending in the same general direction away from a joint portion with the central section and terminating in a penetrating head having a pointed end, each penetrating head formed with a shoulder at a connection between the stem portion and the penetrating head; and
   a separate complementary component having a pair of locking portions arranged so as to be able to receive the penetrating heads and lock them to the separate complementary component by engagement with the shoulder of each penetrating head;
   wherein the shape of the penetrating component is such that material forming the penetrating component provides substantially no external overhang extending outwardly beyond the joint portions between the ear penetrating members and the central section in a direction defined by a straight line extending between the joint portions and each stem portion is hollow and communicates with an open end at the joint portion between each ear penetrating member and the central section provide access for a pair of implant pins of a tag applicator.

2. The tag of claim 1 having attached thereto any one or more of a flag, a flag attached by a swivel, any form of data concerning the animal to which the tag is attached, a transponder, any form of diagnostic or electronic device, any form of treatment device or chemical, any form of signaling device, and any form of locating device.

3. A Tag for attachment to an animal ear comprising:
   a penetrating component having two spaced apart ear penetrating members joined by a central section extending therebetween the penetrating members each having a stem portion extending in the same general direction away from a joint portion with the central section and terminating in a penetrating head having a pointed end, each penetrating head formed with a shoulder at a connection between the stem portion and the penetrating head; and
   a separate complementary component having a pair of locking portions arranged so as to be able to receive the penetrating heads and lock them to the separate complementary component by engagement with the shoulder of each penetrating head;
   wherein the share of the penetrating component is such that material forming the penetrating component provides substantially no external overhang extending outwardly beyond the joint portions between the ear penetrating members and the central section in a direction defined by a straight line extending between the joint portions, the complementary component is configured with a resilient strap connecting the pair of locking portions such that when the locking portions are engaged with the respective penetrating heads of the penetrating members, a medial portion of the strap is biased toward the central section to provide a snug fit with animal skin disposed therebetween while allowing for growth of the animal.

4. The tag of claim 3 wherein the resilient strap includes slot shaped openings through which the penetrating members pass when the penetrating heads are engaged with said locking portions, said slot openings being sized to permit increased separation of the penetrating members to accommodate growth of an animal body portion to which the tag is affixed.

5. A tag for attachment to an animal ear comprising:
   a penetrating component having two spaced apart ear penetrating members joined by a central section extending therebetween the penetrating members each having a stem portion extending in the same general direction away from a joint portion with the central section and terminating in a penetrating head having a pointed end, each penetrating head formed with a shoulder at a connection between the stem portion and the penetrating head; and
   a separate complementary component having a pair of locking portions arranged so as to be able to receive the penetrating heads and lock them to the separate complementary component by engagement with the shoulder of each penetrating head;
   wherein the shape of the penetrating component is such that material forming the penetrating component provides substantially no external overhang extending outwardly beyond the joint portions between the ear penetrating members and the central section in a direction defined by a straight line extending between the joint portions, and each penetrating head comprises a central supporting portion of molded plastics material generally in the form of an arrowhead having at least two thin flanges extending beyond the central supporting portion, the at least two thin flanges having sharp edges and meeting at a sharp point forward of the supporting portion.

6. The tag of claim 5 wherein the separate complementary component comprises two separate slot shaped openings each arranged to receive one of the penetrating heads therethrough.

7. The tag of claim 5 wherein each stem is hollow and communicates with an open end at the joint portion between each ear penetrating member and the central section to provide access for a pair of implant pins of a tag applicator.

8. The Tag of claim 5 wherein the complementary component is configured with a resilient strap connecting the pair of locking portions such that when the locking portions are engaged with the respective penetrating heads of the penetrating members, a medial portion of the strap is biased toward the central section to provide a snug fit with animal skin disposed therebetween while allowing for growth of the animal.

9. The tag of claim 8 wherein the complementary component includes slot shaped openings through which the penetrating members pass when the penetrating heads are engaged with said locking portions, said slot openings being sized to permit increased separation of the penetrating members to accommodate growth of an animal body portion to which the tag is affixed.

* * * * *